United States Patent
Jaidka et al.

(10) Patent No.: US 11,803,872 B2
(45) Date of Patent: *Oct. 31, 2023

(54) CREATING META-DESCRIPTORS OF MARKETING MESSAGES TO FACILITATE IN DELIVERY PERFORMANCE ANALYSIS, DELIVERY PERFORMANCE PREDICTION AND OFFER SELECTION

(71) Applicant: Adobe Inc., San Jose, CA (US)

(72) Inventors: Kokil Jaidka, Bengaluru (IN); Sumit Shekhar, Bangalore (IN)

(73) Assignee: Adobe Inc., San Jose, CA (US)

( * ) Notice: Subject to any disclaimer, the term of this patent is extended or adjusted under 35 U.S.C. 154(b) by 149 days.

This patent is subject to a terminal disclaimer.

(21) Appl. No.: 17/319,881

(22) Filed: May 13, 2021

(65) Prior Publication Data

US 2021/0264463 A1  Aug. 26, 2021

Related U.S. Application Data

(63) Continuation of application No. 15/258,909, filed on Sep. 7, 2016, now Pat. No. 11,055,735.

(51) Int. Cl.
*G06Q 30/0242* (2023.01)
*G06N 20/00* (2019.01)
*G06F 16/245* (2019.01)
*G06F 16/22* (2019.01)

(52) U.S. Cl.
CPC ..... *G06Q 30/0242* (2013.01); *G06F 16/2228* (2019.01); *G06F 16/245* (2019.01); *G06N 20/00* (2019.01)

(58) Field of Classification Search
CPC ........... G06Q 30/0242; G06F 16/2228; G06F 16/245; G06N 20/00
See application file for complete search history.

(56) References Cited

U.S. PATENT DOCUMENTS

| | | |
|---|---|---|
| 6,411,724 B1 | 6/2002 | Vaithilingam et al. |
| 10,360,581 B1 * | 7/2019 | Recce ................. G06Q 30/0275 |
| 2008/0082426 A1 | 4/2008 | Gokturk et al. |

(Continued)

FOREIGN PATENT DOCUMENTS

AU     2006203598 A1 *  9/2006   ......... G06F 17/3043

OTHER PUBLICATIONS

S. Sural, Gang Qian and S. Pramanik, "Segmentation and histogram generation using the HSV color space for image retrieval," Proceedings. International Conference on Image Processing, Rochester, NY, USA, 2002, pp. II-II, doi: 10.1109/ICIP.2002.1040019. (Year: 2002).*

(Continued)

*Primary Examiner* — Kambiz Abdi
*Assistant Examiner* — Scott Snider
(74) *Attorney, Agent, or Firm* — FIG. 1 Patents

(57) ABSTRACT

Various embodiments are directed to assigning offers to marketing deliveries utilizing new features to describe offers in the marketing deliveries. Marketing deliveries can be described at a finer level to thus enhance the effectiveness of building and conducting marketing campaigns. The approaches facilitate matching content to recipients, predicting content performance, and measuring content performance after dispatching a marketing delivery.

20 Claims, 15 Drawing Sheets

(56) References Cited

U.S. PATENT DOCUMENTS

| | | | |
|---|---|---|---|
| 2008/0249832 A1* | 10/2008 | Richardson | G06Q 30/02 705/14.54 |
| 2008/0281627 A1 | 11/2008 | Chang et al. | |
| 2009/0234711 A1* | 9/2009 | Ramer | G06Q 30/0269 705/14.66 |
| 2010/0114802 A1 | 5/2010 | Bobbitt et al. | |
| 2011/0066488 A1* | 3/2011 | Ludewig | G06Q 30/0244 705/14.43 |
| 2011/0161790 A1* | 6/2011 | Junior | G06Q 30/02 715/764 |
| 2013/0018719 A1 | 1/2013 | Abraham et al. | |
| 2013/0346182 A1* | 12/2013 | Cheng | G06Q 30/0242 705/14.41 |
| 2014/0040007 A1* | 2/2014 | Relyea, Jr. | G06Q 30/0242 705/14.57 |
| 2015/0269607 A1* | 9/2015 | Steube | G06Q 30/0244 705/14.43 |
| 2017/0032285 A1 | 2/2017 | Sharma et al. | |
| 2018/0068340 A1 | 3/2018 | Jaidka et al. | |

OTHER PUBLICATIONS

Ying Liu, Dengsheng Zhang, Guojun Lu, Wei-Ying Ma, A survey of content-based image retrieval with high-level semantics, Pattern Recognition, vol. 40, Issue 1, 2007, pp. 262-282, ISSN 0031-3203, https://doi.org/10.1016/j.patcog.2006.04.045. (Year: 2007).*

"Final Office Action", U.S. Appl. No. 15/258,909, dated Oct. 28, 2020, 10 pages.

"First Action Interview Office Action", U.S. Appl. No. 15/258,909, dated Dec. 12, 2019, 23 pages.

"Non-Final Office Action", U.S. Appl. No. 15/258,909, dated Jun. 27, 2019, 19 pages.

"Notice of Allowance", U.S. Appl. No. 15/258,909, dated Mar. 3, 2021, 7 pages.

"Pre-Interview First Office Action", U.S. Appl. No. 15/258,909, dated Jul. 26, 2019, 21 pages.

Blum, Avrim L. et al., "Selection of Relevant Features and Examples in Machine Learning", Artificial Intelligence 97, May 1996, pp. 245-271.

Broder, Andrei et al., "A semantic approach to contextual advertising", SIGIR '07: Proceedings of the 30th annual international ACM SIGIR conference on Research and development in information retrieval, Amsterdam, The Netherlands [retrieved Mar. 3, 2021]. Retrieved from the Internet, <https://citeseerx.ist.psu.edu/viewdoc/download?doi=10.1.1.225.3742&rep=rep1&type=pdf>., Jul. 2007, 8 pages.

Colombo, Carlo et al., "Semantics in Visual Information Retrieval", IEEE MultiMedia, vol. 6, No. 3 [retrieved Mar. 3, 2021]. Retrieved from the Internet <http://citeseerx.ist.psu.edu/viewdoc/download?doi=10.1.1.2.2429&rep=rep1&type=pdf>., Jul. 1999, 16 pages.

Judd, Tilke et al., "Learning to Predict Where Humans Look", International Conference on Computer Vision (ICCV), 2009, Oct. 2009, 8 pages.

Sikora, Thomas, "The MPEG-7 Visual Standard for Content Description—An Overview", IEEE Transactions on Circuits and Systems for Video Technology, vol. 11, No., Jun. 6, 2001, pp. 696-702.

Smith, Ray, "An overview of the Tesseract OCR engine", Proceedings of the Ninth International Conference on Document Analysis and Recognition—Volume, Sep. 23, 2007, 5 pages.

Tian, Shangxuan et al., "Scene Text Recognition Using Co-occurrence of Histogram of Oriented Gradients", 2013 12th International Conference on Document Analysis and Recognition [retrieved Mar. 3, 2021]. Retrieved from the Internet <http://citeseerx.ist.psu.edu/viewdoc/download?doi=10.1.1.703.8336&rep=rep1&type=pdf>., Aug. 2013, 5 pages.

Zhang, Hongming et al., "Learning informative features for spatial histogram-based object detection", Proceedings. 2005 IEEE International Joint Conference on Neural Networks [retrieved Mar. 3, 2021]. Retrieved from the Internet <http://citeseerx.ist.psu.edu/viewdoc/download?doi=10.1.1.138.5122&rep=rep1&type=pdf>., Aug. 2005, 6 pages.

Zhang, Weinan et al., "Feedback Control of Real-Time Display Advertising", arXiv Preprint, arXiv.org [retrieved Mar. 3, 2021]. Retrieved from the Internet <https://arxiv.org/pdf/1603.01055.pdf>., Mar. 3, 2016, 10 pages.

Zhu, Xiangxin et al., "Face Detection, Pose Estimation, and Landmark Localization in the Wild", 2012 IEEE Conference on Computer Vision and Pattern Recognition, 2012, 8 pages.

\* cited by examiner

| Campaign code | Click-to-open rate | Number of images | Number of large images | Number of medium images | Number of small images | Large font-size text | Medium font-size text | white | pink | black | yellow | Image offer | Offer dollar | No. of people | Festive theme |
|---|---|---|---|---|---|---|---|---|---|---|---|---|---|---|---|
| DM114668 | 9.2 | 14 | 0 | 6 | 8 | 5 | 4 | 13 | 7 | 1 | 1 | 8 | 3 | 4 | 1 |
| DM115437 | 9.4 | 7 | 3 | 2 | 2 | 5 | 0 | 4 | 3 | 1 | 1 | 5 | 2 | 1 | 1 |
| DM115440 | 10.5 | 7 | 3 | 2 | 2 | 4 | 3 | 7 | 2 | 1 | 0 | 7 | 2 | 4 | 1 |
| DM115442 | 13.6 | 5 | 1 | 6 | 3 | 4 | 5 | 7 | 1 | 7 | 2 | 2 | 1 | 6 | 0 |
| DM115448 | 10.4 | 7 | 3 | 2 | 2 | 4 | 3 | 7 | 2 | 1 | 0 | 7 | 2 | 4 | 1 |
| DM115473 | 10.8 | 7 | 3 | 2 | 2 | 4 | 3 | 7 | 2 | 1 | 1 | 7 | 2 | 4 | 1 |
| DM115474 | 32.9 | 7 | 3 | 2 | 2 | 5 | 0 | 4 | 3 | 1 | 1 | 5 | 2 | 1 | 1 |
| Average | 13.8 | 7.7 | 2.3 | 3.1 | 3 | 4.4 | 2.6 | 7 | 2.8 | 1.8 | 0.8 | 5.8 | 2 | 3.4 | 0.8 |
| Std. Dev. | 8.5 | 2.9 | 1.2 | 1.9 | 2.2 | 0.5 | 1.9 | 3 | 1.9 | 2.3 | 0.7 | 2.0 | 0.6 | 1.8 | 0.4 |

Fig. 11

| Campaign code | Click rate | Size-M | Size-S | Offer theme* | Large font-size text | Medium font-size text | Small font-size text | white | pink | black | blue | Punctuation | Offer dollar | No. of people | Offer text bold |
|---|---|---|---|---|---|---|---|---|---|---|---|---|---|---|---|
| DM114668 | 0.04 | 0 | 1 | 0 | 0 | 0 | 1 | 1 | 1 | 1 | 0 | 0 | 0 | 0 | 0 |
| DM114668 | 0.15 | 0 | 1 | 0 | 0 | 0 | 1 | 1 | 0 | 0 | 0 | 1 | 0 | 0 | 0 |
| DM114668 | 0.39 | 1 | 0 | 1 | 1 | 0 | 0 | 1 | 0 | 0 | 0 | 1 | 0 | 0 | 1 |
| DM114668 | 0.1 | 0 | 1 | 2 | 1 | 0 | 0 | 1 | 0 | 0 | 0 | 0 | 1 | 0 | 1 |
| DM114668 | 0.06 | 0 | 1 | 2 | 0 | 1 | 0 | 1 | 1 | 0 | 0 | 0 | 1 | 1 | 0 |
| DM114668 | 0.06 | 1 | 0 | 3 | 0 | 1 | 0 | 1 | 0 | 1 | 1 | 1 | 0 | 1 | 0 |
| DM114668 | 0.08 | 1 | 0 | 4 | 0 | 1 | 0 | 0 | 1 | 0 | 1 | 0 | 1 | 0 | 0 |
| DM114668 | 0.08 | 1 | 0 | 5 | 0 | 1 | 0 | 1 | 1 | 1 | 0 | 0 | 0 | 0 | 0 |
| DM114668 | 0.01 | 0 | 1 | 0 | 1 | 0 | 0 | 1 | 1 | 0 | 0 | 1 | 0 | 0 | 1 |

Fig. 12

CREATING META-DESCRIPTORS OF MARKETING MESSAGES TO FACILITATE IN DELIVERY PERFORMANCE ANALYSIS, DELIVERY PERFORMANCE PREDICTION AND OFFER SELECTION

RELATED APPLICATIONS

This application is a continuation of and claims priority to U.S. patent application Ser. No. 15/258,909, filed Sep. 7, 2016, entitled "Creating Meta-Descriptors of Marketing Messages to Facilitate In Delivery Performance Analysis, Delivery Performance Prediction and Offer Selection", the entire disclosure of which is hereby incorporated by reference herein in its entirety.

BACKGROUND

A "delivery" is an electronic marketing message, such as an email, SMS or push message, that is sent to many recipients. A delivery typically includes graphics and text, some parts of which are clickable, while other parts of which are not clickable. Some of the clickable parts are offers for products or services. By clicking on the clickable parts of a delivery, a consumer can be exposed to details associated with the offer, such as launching a web page that provides additional product details such as available colors, sizes, etc. Deliveries are usually prepared by a marketer. When preparing a delivery, a marketer can have access to a catalog of pre-created offers from which offers can be selected. Marketers can select offers by specifying a high level theme, such as "pant suits", and tags related to the offers, so that only relevant offers are activated (e.g., 25% off pant suits). One problem with current approach is that offers are not well identified which, in turn, causes the marketer to have to scroll through large numbers of offers to find one that is appropriate to his or her marketing message. In addition, offer tags are not automatic and the hierarchy of offers needs to be manually created. For example, marketers typically have a catalog of assets, such as images, offers and banners, which are indexed in some manner, and can be added into an email. The indexing is done manually, using tags. Currently tagging of these assets (such as assets having bold text or images of humans) is not done automatically.

According to some existing approaches, a marketer may manually create coded rules to assign offers to recipients. These coded rules may designate who gets special offers based on their age, gender, loyalty points, the number of deliveries previously sent to them, and the like. Creating these rules is a tedious and cumbersome process. Further, this process does not scale well where the consumers are in the order of millions, or when there are many new consumers for whom there is not enough information to enable the consumers to qualify for possible offers.

Furthermore, after a message has been dispatched, the marketer will typically not know which components of the delivery made it successful, nor does the marketer have enough information to replicate the delivery's success in the future.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

Various embodiments are directed to assigning offers to marketing deliveries utilizing new features to describe offers in the marketing deliveries. The new features are referred to herein as "meta-descriptors." The meta-descriptors pertain to how offers are arranged, which products are mentioned, which themes are utilized, and which fonts, backgrounds, and color schemes are utilized in connection with the delivery. For specific consumers, termed a "target dimension" (such as recipients between age 18-26) important applicable meta-descriptors are identified which contribute to a campaign's click rate, conversion rate, and order value per transaction by using a predictive modeling approach. Important applicable meta-descriptors are those that result in higher key performance indicators than other meta-descriptors. The predictive modeling approach utilizes a performance prediction workflow that predicts performance at three different levels—the overall delivery level, the offer level, and the meta-descriptor level. At each level, the predictive modeling approach uses a training module and a testing module.

At the overall delivery level, the training module processes training content associated with the delivery, such as HTML files associated with the delivery, along with input provided by a marketer such as key performance indicators (KPI) such as open rate, click rate, and the like, as well as target dimension. The training module extracts meta-descriptors from the HTML files at the delivery level and processes the meta-descriptors along with information associated with how this content performed to produce a concatenation that describes meta-descriptors and content performance for each delivery. A pattern-learning algorithm can be employed to process the concatenations, i.e., rows of data, to identify which features of the delivery provide the best performance. The learned model of these features provides a performance predictor. Performance predictors can be thought of as a set of rules that establish a relationship between the features of the delivery and the actual value of the KPI. This can be performed by using supervised machine learning.

The testing module then processes test content for the delivery that is to be employed by the marketer. The testing module receives content associated with the delivery, such as HTML files associated with the delivery, along with input provided by the marketer such as KPIs and the target dimension to be tested. From this, the testing module extracts meta-descriptors at the delivery level and processes the meta-descriptors along with information associated with how this content performed, e.g., according to a quantification scheme, to produce a concatenation that describes meta-descriptors and content performance for each delivery. The testing module then uses the predictor from the training module to output a predicted KPI value.

A similar approach can be utilized at the offer level and the meta-descriptor level. The described approaches can be applied to predict the performance of a delivery, offer, and/or meta-descriptors at design time, before the delivery is actually produced and sent out to its consumers.

Various workflows can be utilized to enrich offers and deliveries with relevant tags to help marketers create engaging content.

For example, content of a set of deliveries and meta-descriptors extracted from the set of deliveries can be received. The content can include sets of HTML files associated with the delivery. Marketer input in the form of KPI and target dimension can also be received. A semantic description of the meta-descriptors is created. Next, weights can be assigned to the meta-descriptors according to the performance prediction described above. That is, when the predictors learn which meta-descriptors of a particular delivery lead to better KPI values, weights can be assigned accordingly. Thus, better performing meta-descriptors will receive higher weights. With the weights and the semantic descriptions having been created, tags associated with the deliveries can be enriched. The tags are enriched by associating the weights and the semantic descriptions with the individual respective deliveries or offers. This creates a searchable collection of deliveries that can be searched by a marketer using the enriched tags. In this manner, marketers can see which deliveries or offers performed better for a particular searched tag. This can enable a marketer to select a particular delivery, which performed better than other deliveries, to use in their marketing campaign.

BRIEF DESCRIPTION OF THE DRAWINGS

The detailed description is described with reference to the accompanying figures.

FIG. 11 is a table in accordance with one embodiment.

FIG. 12 is a table in accordance with one embodiment.

DETAILED DESCRIPTION

Overview

Figure 1:
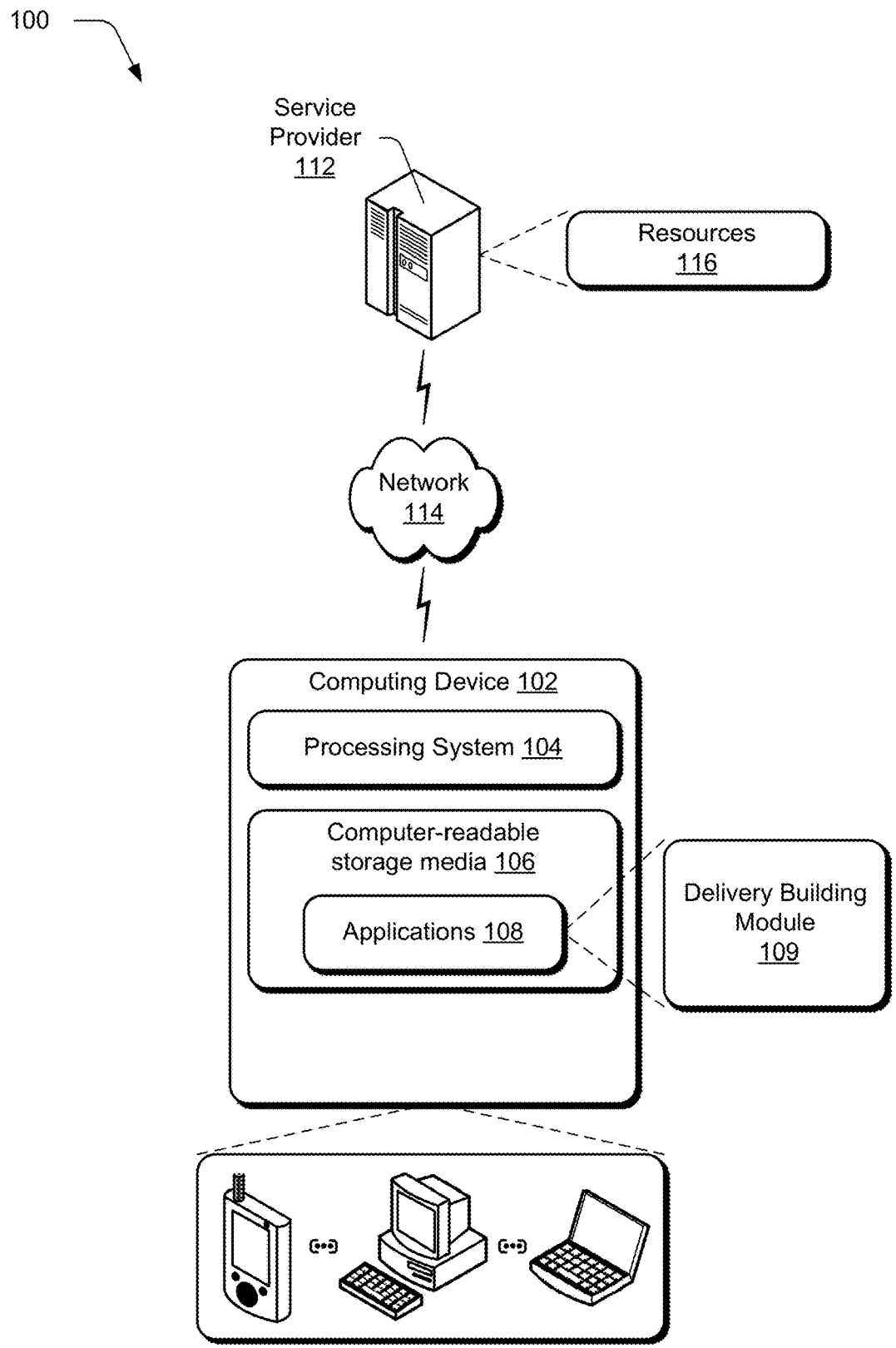
FIG. 1 is an illustration of a digital medium environment in an example implementation that is operable to employ techniques described herein.

Various embodiments are directed to assigning offers to marketing deliveries utilizing new features to describe offers in the marketing deliveries. The new features are referred to herein as "meta-descriptors." The meta-descriptors pertain to how offers are arranged, which products are mentioned, which themes are utilized, and which fonts, backgrounds, and color schemes are utilized in connection with the delivery. For specific consumers, termed a "target dimension" (such as recipients between age 18-26) important applicable meta-descriptors are identified which contribute to a campaign's click rate, conversion rate, and order value per transaction by using a predictive modeling approach. Important applicable meta-descriptors are those that result in higher key performance indicators than other meta-descriptors. The predictive modeling approach utilizes a performance prediction workflow that predicts performance at three different levels—the overall delivery level, the offer level, and the meta-descriptor level. At each level, the predictive modeling approach uses a training module and a testing module.

At the overall delivery level, the training module processes training content associated with the delivery, such as HTML files associated with the delivery, along with input provided by a marketer such as key performance indicators (KPI) such as open rate, click rate, and the like, as well as target dimension. The training module extracts meta-descriptors at the delivery level and processes the meta-descriptors along with information associated with how this content performed to produce a concatenation that describes meta-descriptors and content performance for each delivery. Content performance can be quantified using any suitable quantification scheme, e.g., on a scale between 1-100, with 1 being the worst and 100 being the best. Each concatenation consists of one row of data which includes the meta-descriptors and the performance of the particular delivery. There can be many rows of data, e.g. thousands of rows of data. A pattern-learning algorithm can be employed to process the concatenations, i.e., rows of data, to identify which features of the delivery seem to provide the best performance. The learned model of these features provides a performance predictor. Performance predictors can be thought of as a set of rules that establish a relationship between the features of the delivery and the actual value of the KPI. This can be performed by using supervised machine learning. Supervised machine learning is the machine learning task of inferring a function from labeled training data. The training data consist of a set of training examples. In supervised learning, each sample is a pair consisting of an input object, typically a vector (such as a concatenation), and a desired output value. A supervised learning algorithm analyzes the training data and produces an inferred function (in this case a predictor). An optimal scenario will allow for the algorithm to correctly determine the class labels for unseen instances which can be used for mapping new examples. A predictor is produced for each KPI and each target dimension. The predictor predicts how the respective delivery will perform. A predictor is produced for each KPI and each target dimension. The predictor predicts how the respective delivery will perform.

The testing module then processes test content for the delivery that is to be employed by the marketer. The testing module receives content associated with the delivery, such as HTML files associated with the delivery, along with input provided by the marketer such as KPIs and the target dimension to be tested. From this, the testing module extracts meta-descriptors at the delivery level and processes the meta-descriptors along with information associated with how this content performed, e.g., according to a quantification scheme, to produce a concatenation that describes meta-descriptors and content performance for each delivery. The testing module then uses the predictor from the training module to output a predicted KPI value. That is, the set of rules (i.e. the predictor), developed by the training module, when applied to the concatenation of meta-descriptors and content performance for each delivery, produces a predicted KPI value for the individual delivery.

A similar approach can be utilized at the offer level and the meta-descriptor level. The described approaches can be applied to predict the performance of a delivery, offer, and/or meta-descriptors at design time, before the delivery is actually produced and sent out to its consumers.

Various workflows can be utilized to enrich offers and deliveries with relevant tags to help marketers create engaging content.

For example, content of a set of deliveries and meta-descriptors extracted from the set of deliveries can be received. The content can include sets of HTML files associated with the delivery. Marketer input in the form of KPI and target dimension can also be received. A semantic description of the meta-descriptors is created. So, for example, a semantic description can include "human smiling" for a meta-descriptor that identifies a human face. Next, weights can be assigned to the meta-descriptors according to the performance prediction described above. That is, when the predictors learn which meta-descriptors of a particular delivery lead to better KPI values, weights can be assigned accordingly. Thus, better performing meta-descriptors will receive higher weights. With the weights and the semantic descriptions having been created, tags associated with the deliveries can be enriched. The tags are enriched by associating the weights and the semantic descriptions with the individual respective deliveries or offers. This creates a searchable collection of deliveries that can be searched by the enriched tags. Now, when a marketer searches for a particular tag, e.g., "smiling faces", deliveries or offers can be presented that include smiling faces, in decreasing order of weights. In this manner, marketers can see which deliveries or offers performed better for a particular searched tag. This can enable a marketer to select a particular delivery, which performed better than other deliveries, to use in their marketing campaign.

In the following discussion, an example digital medium environment is first described that can employ the techniques described herein. Example implementation details and procedures are then described which can be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a computing device 102 including a processing system 104 that includes one or more processing devices, one or more computer-readable storage media 106, and various applications 108 embodied on the computer-readable storage media 106 and operable via the processing system 104 to implement corresponding functionality described herein.

In at least some implementations, applications 108 include or otherwise make use of a delivery building module 109. In some implementations, the delivery building module 109 is a standalone application. In other implementations, the delivery building module 109 is included as part of another application or system software such as a computing device's operating system. The delivery building module 109 is configured to enable meta-descriptors to be defined, selected and used to characterize offers in a theme-agnostic manner which promotes indexing the offers, identifying related offers, and searching for offers, as described below in more detail. Theme-agnosticism pertains to how an offer looks in a particular delivery, irrespective of an offer's theme.

Offers and content within offers can be automatically processed to identify relevant meta-descriptors. This can be done using hardware and software that analyzes the offers and content for context such as images, color, text, fonts, font sizes, layout, text-to-image percentage, and the like. Meta-descriptors can include, by way of example and not limitation, color meta-descriptors, font and style meta-descriptors, delivery layout meta-descriptors, human meta-descriptors, and product/offer/delivery theme meta-descriptors.

Color meta-descriptors can be developed by extracting information associated with hue and saturation of images that appear in an offer. Hue is determined by the dominant wavelength within the visible light spectrum at which the energy output from a source is greatest. Saturation is determined by the excitation purity, and depends on the amount of white light mixed with the hue. Color meta-descriptors can also be developed by extracting information on how colors are spatially arranged within an image. Typically, an image sensor, such as a machine vision camera, can be used to capture an image which can then be processed by image processing software to extract color data and perform analysis to develop information pertaining to the hue, saturation, and spatial arrangement of colors within an image.

Font and style meta-descriptors can be developed by analyzing offers to ascertain the fonts that appear within the offer, the size of the fonts, and various styles (e.g., formatting and layout properties) associated with the offer. This can be done in an automated way using optical character recognition (OCR) analysis to extract text from an offer and then using processing software to process the extracted text to identify font and style information.

Delivery layout meta-descriptors can be developed by analyzing the delivery to ascertain how the delivery's content is laid out. This can be done by analyzing a delivery, via analysis software, to ascertain how and where images, offers, banners, and other content are arranged.

Human meta-descriptors can be developed by using image processing software to identify human images and attributes of human images that appear within a particular offer. Image processing software can include facial detection and facial recognition software that can recognize human faces and can ascertain properties or characteristics of the human faces that appear within an offer. Such software can utilize facial recognition algorithms to identify facial features by extracting landmarks, or features, from an image of a subject's face. For example, the algorithm may analyze the relative position, size, and/or shape of the eyes, nose, cheekbones, and jaw.

Product/offer/delivery theme meta-descriptors can be developed by determining the number of products in an offer, number of offers in a delivery, number of images in the offer or delivery, proportion of special sales and discount to offers, and theme of the delivery.

Once the meta-descriptors have been developed, the delivery building module 109 associates the meta-descriptors with the offers or deliveries by including the meta-descriptors as part of an offer's or delivery's metadata which, in turn, helps in indexing and searching for offers or deliveries, as described below in more detail. For example, the offers and deliveries can be automatically saved in a searchable database along with metadata, i.e. meta-descriptors, that are associated with each offer and delivery. These meta-descriptors can then form the basis of a searchable index to easily identify offers or deliveries that meet particular search criteria entered by a marketer.

This constitutes an improvement over current approaches which use a primarily manual approach in which content is tagged by a marketer. The manual approach can be very subjective and can vary widely depending on the individual applying the tags. This leads to a non-standardized approach which, in turn, is not easily scalable in a predictable way. The delivery building module 109 is also configured to automatically generate rules for assigning offers to outbound deliveries, irrespective of the availability of a particular customer's personal information. This enables the system to easily deal with new customers for whom historic information has not yet been developed. The delivery building module 109 is also configured to utilize separate workflows for offer performance analytics and prediction at three levels of details—the overall delivery level (e.g., the email level), the offer level, and the meta-descriptor level. The delivery building module 109 utilizes different novel workflows for providing a predictive modeling approach, to predict the performance of an offer with respect to a marketer's KPIs. At each level, the predictive modeling approach uses a training module and a testing module.

For example, at the overall delivery level, the training module processes training content associated with the delivery, such as HTML files associated with the delivery, along with input provided by a marketer such as key performance indicators (KPI) such as open rate, click rate, and the like, as well as target dimension. The training module extracts meta-descriptors at the delivery level and processes the meta-descriptors along with information associated with how this content performed to produce a concatenation of meta-descriptors and content performance for each delivery. Content performance can be quantified using any suitable quantification scheme, e.g., on a scale between 1-100, with 1 being the worst and 100 being the best. Each concatenation consists of one row of data which includes the meta-descriptors and the performance of the particular delivery. There can be many rows of data, e.g. thousands of rows of data. A pattern-learning algorithm can be employed to process the concatenations, i.e., rows of data, to identify which features of the delivery seem to provide the best performance. The learned model of these good features provides a performance predictor. Performance predictors can be thought of as a set of rules that establish a relationship between the features of the delivery and the actual value of the KPI. This can be performed by using supervised machine learning. A predictor is produced for each KPI and each target dimension. The predictor predicts how the respective delivery will perform.

The testing module then processes test content for the delivery that is to be employed by the marketer. The testing module receives content associated with the delivery, such as HTML files associated with the delivery, along with input provided by the marketer such as KPIs and the target dimension to be tested. From this, the testing module extracts meta-descriptors at the delivery level and processes the meta-descriptors along with information associated with how this content performed, e.g., according to a quantification scheme, to produce a concatenation of meta-descriptors and content performance for each delivery. The testing module then uses the predictor from the training module to output a predicted KPI value. That is, the set of rules (i.e. the predictor), developed by the training module, when applied to the concatenation of meta-descriptors and content performance for each delivery, produces a predicted KPI value for the individual delivery.

A similar approach can be utilized at the offer level and the meta-descriptor level. The described approaches can be applied to predict the performance of a delivery, offer, and/or meta-descriptors at design time, before the delivery is actually produced and sent out to its consumers.

Applications 108 may also include a web browser which is operable to access various kinds of web-based resources (e.g., content and services). In at least some implementations, the applications include one or more video players, such as Adobe® Flash® Player, a YouTube™-type application, and the like. In at least some implementations, the applications 108 represent a client-side component having integrated functionality operable to access web-based resources (e.g., a network-enabled application), browse the Internet, interact with online providers, and so forth. Applications 108 further include an operating system for the computing device 102 and other device applications.

The computing device 102 may be configured as any suitable type of computing device. For example, the computing device may be configured as a desktop computer, a laptop computer, a mobile device (e.g., assuming a handheld configuration such as a tablet or mobile phone), a tablet, a camera, and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 15.

The digital medium environment 100 further depicts one or more service providers 112, configured to communicate with computing device 102 over a network 114, such as the Internet, to provide a "cloud-based" computing environment. Generally speaking, a service provider 112 is configured to make various resources 116 available over the network 114 to clients. In some scenarios, users may sign up for accounts that are employed to access corresponding resources, such as streaming video, from a provider. The provider may authenticate credentials of a user (e.g., username and password) before granting access to an account and corresponding resources 116. Other resources 116 may be made freely available, (e.g., without authentication or account-based access). The resources 116 can include any suitable combination of services and/or content typically made available over a network by one or more providers. Some examples of services include, but are not limited to, a notification service (such as one that sends various types of notifications to applications 108 and delivery building module 109), a content publisher service that distributes content, such as streaming videos and the like, to various computing devices, an advertising server service that provides advertisements to be used in connection with distributed content, a web development and management service, a collaboration service, a social networking service, a messaging service, and so forth. Content may include various combinations of assets, video comprising part of an asset, advertisements, audio, multi-media streams, animations, images, web documents, web pages, applications, device applications, and the like.

Various types of input devices and input instrumentalities can be used to provide input to computing device 102. For example, the computing device can recognize input as being a mouse input, stylus input, touch input, input provided through a natural user interface, and the like. Thus, the computing device can recognize multiple types of gestures including touch gestures and gestures provided through a natural user interface.

Having considered an example digital medium environment, consider now two example offers that can be processed by the inventive embodiments described herein.

Figure 2:
FIG. 2 illustrates an example offer that can be utilized in a delivery.

FIG. 2 illustrates two different offers that can appear in a delivery, generally at 200. A first of the offers is illustrated at 202 and a second of the offers is illustrated at 204. First offer 202 is a pure textual offer that incorporates the use of various font sizes, including a somewhat larger font size to convey "70% off". Second offer 204 is a mixed offer and includes both images and textual components. The primary focus of this offer is the human images, with less emphasis on the textual components. The various embodiments described herein are directed to predicting the performance of these different kinds of offers and deliveries and others, as well as enabling the offers to be assigned to various deliveries. As such, the embodiments described below are directed to solving three different problems that face marketers—(1) how to assign offers to marketing deliveries, (2) how to score the performance of content in marketing deliveries, and (3) how to use delivery performance information, such as email performance information, to send more relevant offers to recipients.

The solution to the problem of assigning offers to marketing deliveries (item (1)) is achieved by breaking down emails or marketing message content to a level of the features of its content and offers, so as to better organize and identify related offers. These features are defined by a novel collection of meta-descriptors described below. The solution of how to score the performance of content (item (2)) is achieved by using the features (meta-descriptors) created just above, to measure the performance of the content, and thus predict the performance of a future delivery based on these features. This solution is far more than simply measuring whether a particular offer was clicked or otherwise selected. For example, the solution can measure what types, sizes, and colors of images were selected, to name just a few. The solution to the problem of sending more relevant offers (item (3)) is achieved by using the features (meta-descriptors) created above to identify recipient preferences at a finer level, and thus suggest the right recipients for an offer or the collection of content in a delivery.

The various implementations thus improve upon the current state of the art by providing an improved system that provides a diagnostic or predictive tool which actually affixes the estimated or predicted contribution of a layout to conversion and, at the same time, considers a rich set of meta-descriptors in delivery performance. Conversion refers to conversion rate. The various embodiments are targeted to help marketers who are sending deliveries, such as email deliveries. In that context, conversion means the revenue generated from these email deliveries. Conversion can be calculated in various ways, such as number of clicks, number of transactions, revenue from transactions, and so on. Because each of the tagged offers and assets in an email plays a role in the performance of the email, through this we can establish how much layout of a delivery has contributed to certain key performance indicator KPI performance. An example of how this can be done is provided below in connection with FIGS. 11-14 and the related discussion below.

The improved system also enables ranking of the best performing layouts, color schemes, and/or themes. Thus, the improved system described herein provides a robust approach to analyzing visual features of marketing communications for predicting performance.

Example Delivery Building Module

Figure 3:
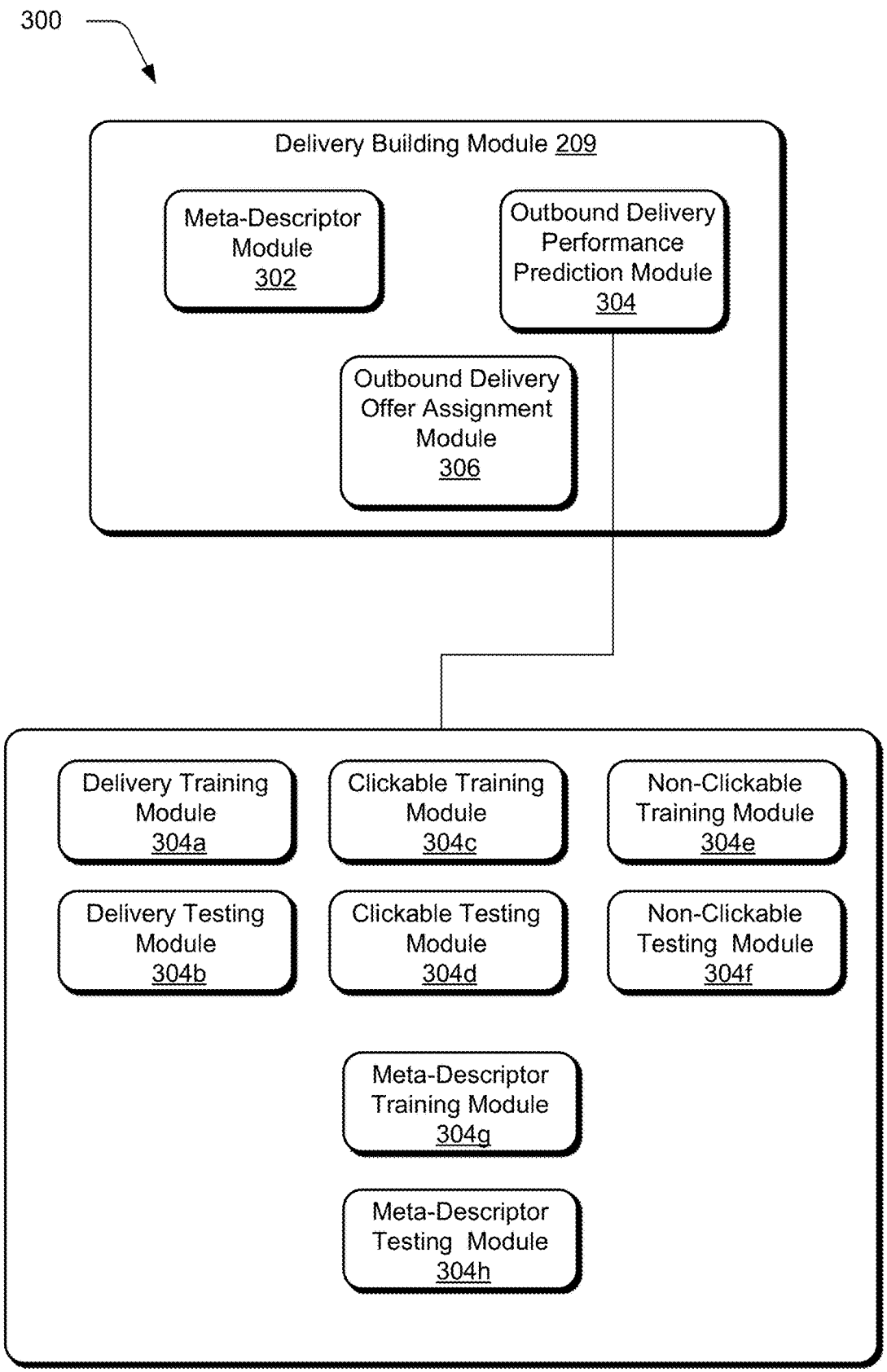
FIG. 3 illustrates an example delivery building module in accordance with one or more embodiments.

FIG. 3 illustrates an example delivery building module 209 in accordance with one or more embodiments. In the illustrated example, delivery building module 209 includes a meta-descriptor module 302, an outbound delivery performance prediction module 304, and an outbound delivery offer assignment module 306, each of which is separately described below under its own heading. The modules can be implemented in connection with any suitable hardware, software, firmware or combination thereof. In at least some embodiments, the modules are implemented in software that resides on some type of non-transitory computer-readable media.

Meta-Descriptor Module

In accordance with one or more embodiments, the delivery building module 209, by way of the meta-descriptor module 302, processes multiple offers in an automated manner to extract meta-descriptors that are theme-agnostic. The meta-descriptor module is configured to extract multiple different meta-descriptors by using multiple different respective modules to extract individual respective meta-data descriptors. In the illustrated and described example the meta-descriptors include color meta-descriptors, font and style meta-descriptors, delivery layout meta-descriptors, human meta-descriptors, and product/offer/delivery theme meta-descriptors. Accordingly, the delivery building module can utilize a color meta-descriptor module, a font and style meta-descriptor module, a delivery layout meta-descriptor module, a human meta-descriptor module, and a product/offer/delivery theme meta-descriptor module to extract individual respective meta-descriptors, each of which is discussed below under its own heading.

Color Meta-Descriptors

Color plays an important role in determining performance of a delivery. While a sharp and vivid image can attract users to explore products, a dull color theme may shy them away. Accordingly, in various embodiments, the meta-descriptor module 302 processes offers of a delivery to extract relevant features to describe the color theme of the overall delivery and its individual offers. This can include extracting information associated with hue and saturation of all images in an offer that are greater than a particular size, and building a histogram for each offer that includes the hue and saturation information. For example, a particular delivery may contain a large number of images some of which may be quite small in size, such as icons and the like. The smaller images are not processed to develop hue and saturation information partly because the smaller images typically play a negligible role in the success of a campaign. Rather, only images meeting a certain size threshold are processed. The size threshold can be set by a marketer, via a suitably configured user interface, and can vary depending on the marketer's needs.

An image's hue and saturation can be extracted in any suitable way. For example, an image sensor, such as a machine vision camera, can be used to capture an image which can then be processed by image processing software to extract color data and perform analysis to develop information pertaining to the hue and saturation that can be used to build a histogram for an offer.

In addition, the delivery is processed by an automated color layout descriptor to describe the spatial arrangement of colors. The color layout descriptor produces various descriptors, such as scalable color descriptors that describe the color distribution in an image and dominant color descriptors which describe global as well as local spatial color distribution in an image. Any suitable color layout descriptor can be utilized, an example of which is described in Sikora, Thomas. "*The MPEG-7 visual standard for content description-an overview.*" IEEE Transactions on Circuits and Systems for Video Technology, 11.6 (2001): 696-702. To date, color meta-descriptors, such as those described above, have not been employed in connection with marketing messages to facilitate in delivery performance analysis, delivery performance prediction and offer selection as described in this document. Accordingly, processing the delivery as described above provides information on what kinds of colors are present in the delivery's images and how the colors are arranged. This information can be used to define color meta-descriptors.

Font and Style Meta-Descriptors

Textual descriptions within offers can be an important predictor of delivery performance. That is, textual descriptions that are more "eye-catching" tend to be more successful than textual descriptions that are not eye-catching. In accordance with one or more embodiments, attributes of textual content of the delivery and its component offers are measured by the meta-descriptor module 302 through the use of several descriptors.

A first of the descriptors pertains to the proportion of text to the image at the offer level or at the delivery level. This can be derived from a word histogram and number of images greater than a certain size in the delivery. A word histogram is a frequency distribution of words in the offer or delivery. Here, we consider a minimum size to represent content, as some images are of a few pixels in dimension. Accordingly, we wish to avoid small text and images.

A second of the descriptors pertains to the style, color, and size descriptions of the text in the image, at the offer or delivery level. This is an important feature because the effect of text might vary due to its size and style, e.g., a bigger, easy-to-read font might lead to a higher click rate. This can be ascertained by observing the effects of a particular offer or delivery, e.g. click through rate, and correlating the effect with the descriptors of the offer or delivery. This can be done in an automated fashion by a system that processes and correlates KPIs with meta-descriptors. For example, meta-descriptors associated with larger fonts may be correlated with higher click-through rates. In the illustrated and described example, optical character recognition (OCR) techniques are utilized to extract text from the offers. OCR techniques typically convert different types of documents, such as scanned paper documents, PDF files or images into editable and searchable data. An example of such techniques are described in Smith, Ray. "*An overview of the Tesseract OCR engine.*" ICDAR. IEEE, 2007. To date, font and style meta-descriptors, such as those described above, have not been employed in connection with marketing messages to facilitate in delivery performance analysis, delivery performance prediction and offer selection as described in this document.

Delivery Layout Meta-Descriptors

Delivery layout can be important in determining a delivery's performance. Delivery layout pertains to how various images are arranged in an offer and, for example, how the image and textual description of the offer are placed inside the image. Different delivery layouts are possible for the same set of offers, but the delivery performance may be different depending upon the ease of browsing within the particular delivery. So, for the same set of assets—such as images, offers and banners, one can arrange the assets differently to achieve several alternatives of what the layout of the final delivery could be.

In accordance with one or more embodiments, delivery layout is captured by the meta-descriptor module 302 through the following meta-descriptors: (1) number and size of images and offers; and (2) spatial histograms describing the placement of offers and textual descriptions in the delivery. This is done, in at least some embodiments, by using a grid-based approach which divides an offer into grids and then describes how images are displayed inside the grid using the spatial histogram. For example, consider the layout of an email delivery. The text in a delivery can be placed at the top, middle or bottom. So we can represent the area within the delivery as a grid, and then use an algorithm to decide which is the best position to choose for text. Each of these placements would presumably have the potential to have a different effect on performance. So, for example, statistics can be maintained on the performance effect of a delivery for different layouts, e.g., delivery layouts with text appearing in the top center grid cell have click-through rates that are 25% higher than delivery layouts with text appearing in the bottom center grid cell. Further, for the same content, to identify the content's different locations within an email layout, an x-y coordinate system can be used to describe the placement of the content within an email. For the same content at different positions, performance information can be ascertained when the content is placed in the different positions within the email layout. In practice, this information can be developed for millions of emails and several variants, depending on how many times and image was used and in how many different positions it was used. This historical information can then help to train a machine learning model, which identifies that over all of the positions within an email, certain positions worked better than others. Depending on how the data is filtered or subsetted, this can provide a "best choice" for an overall recipient base or a certain segment, such as a certain age group.

To date, delivery layout meta-descriptors, such as those described above, have not been employed in connection with marketing messages to facilitate in delivery performance analysis, delivery performance prediction and offer selection as described in this document.

Human Meta-Descriptors

Human images are often used in offers to attract a viewer's attention. FIG. 1 illustrates but one example of the use of human images in an offer. In accordance with one or more embodiments, certain useful attributes of human images, such as faces, are extracted by the meta-descriptor module 302 to assess the images' impact on performance. Any suitable techniques can be utilized to extract human images. One non-limiting example is described in Zhu, Xiangxin, and Deva Ramanan. "*Face detection, pose estimation, and landmark localization in the wild.*" IEEE Conference on Computer Vision and Pattern Recognition (CVPR), 2012. Meta-descriptors that can be utilized include, by way of example not limitation, (1) the number of people in an offer image or delivery; and (2) various attributes of people appearing in an image. The attributes can be attributes of the human face such as, by way of example and not limitation, male or female, smiling or not smiling, and the like. To date, human meta-descriptors, such as those described above, have not been employed in connection with marketing messages to facilitate in delivery performance analysis, delivery performance prediction and offer selection as described in this document.

Product/Offer/Delivery Theme Meta-Descriptors

Meta-descriptors in this category pertain to the overall theme and product descriptions in a delivery. The meta-descriptors can include, by way of example and not limitation, (1) number of products in the offer content; (2) number of offers; (3) number of images in the offer or delivery; (4) proportion of special sales and discount to offers; and (5) theme of the delivery such as seasons, festivals, types of products, and the like.

As noted above, the meta-descriptors, as extracted by the meta-descriptor module 302, facilitate indexing offers for ease of searchability when building a marketing campaign. For example, once the meta-descriptors for an offer or delivery are extracted, the meta-descriptors can be saved as metadata of the offer or delivery. This can then enable indexing and easy searching. Further, the meta-descriptors can assist in identifying related offers, as described below in more detail.

Having considered examples of meta-descriptors in accordance with one or more embodiments, consider now an approach which is directed to predicting content performance which, in turn, can be used to enhance offers through the use of the outbound delivery performance prediction module 304.

Outbound Delivery Performance Prediction Module

In one or more embodiments, three different workflows are utilized by the outbound delivery performance prediction module 304 for predicting content performance. The workflows occur at the overall delivery level, offer level, and meta-descriptor level. Each individual level has, in turn, a training module and a testing module. For example, the delivery level includes a delivery training module 304a and a delivery testing module 304b. The offer level includes a clickable training module 304c, a clickable testing module 304d, a non-clickable training module 304e, and a non-clickable testing module 304f. The meta-descriptor level includes a meta-descriptor training module 304g and a meta-descriptor testing module 304h. Operation of these modules is described in relation to FIGS. 4-7 below. The training module is designed to train a performance prediction model which, when trained, can then be used to predict content performance based on information that is intended to be used by a marketer in a marketing campaign.

The training module pertains to a training process that is designed to mitigate the effects of not having historic customer information. The training module does this by processing training content, such as HTML files, various KPIs, and input target dimensions to create a concatenation of meta-descriptors and performance of the training content. The concatenation consists of a row of data which includes the meta-descriptors and the performance of the particular delivery. There can be many rows of data, e.g. thousands of rows of data. A pattern-learning algorithm can be employed to process the concatenations, i.e., rows of data, to identify which features of the delivery seem to provide the best performance. The learned model of these good features provides a performance predictor. Performance predictors can be thought of as a set of rules that establish a relationship between the features of the delivery and the actual value of the KPI. This can be performed by using supervised machine learning. A predictor is produced for each KPI and each target dimension. The predictor predicts how the respective delivery will perform. Thus, the training module is designed to provide historic-type customer information that can then be utilized by the testing module to test actual deliveries that are going to be utilized by a marketer. That is, the testing module then processes test content for the delivery that is to be employed by the marketer. The testing module receives content associated with the delivery, such as HTML files associated with the delivery, along with input provided by the marketer such as KPIs and the target dimension to be tested. From this, the testing module extracts meta-descriptors at the delivery level and processes the meta-descriptors along with information associated with how this content performed, e.g., according to a quantification scheme, to produce a concatenation of meta-descriptors and content performance for each delivery. The testing module then uses the predictor from the training module to output a predicted KPI value. That is, the set of rules (i.e. the predictor), developed by the training module, when applied to the concatenation of meta-descriptors and content performance for each delivery, produces a predicted KPI value for the individual delivery. That is, the training modules are used to build the predictive model which is then used by the marketers to predict performance at the various levels. Consider now the training and testing modules at the overall delivery level.

Overall Delivery Level

The overall delivery level pertains to measuring which meta-descriptors would be useful to aid the marketer for a particular dimension and key performance indicator (KPI) at the delivery level. The workflow includes a training module and a testing module and is described in connection with the flow diagram of FIG. 4.

Figure 4:
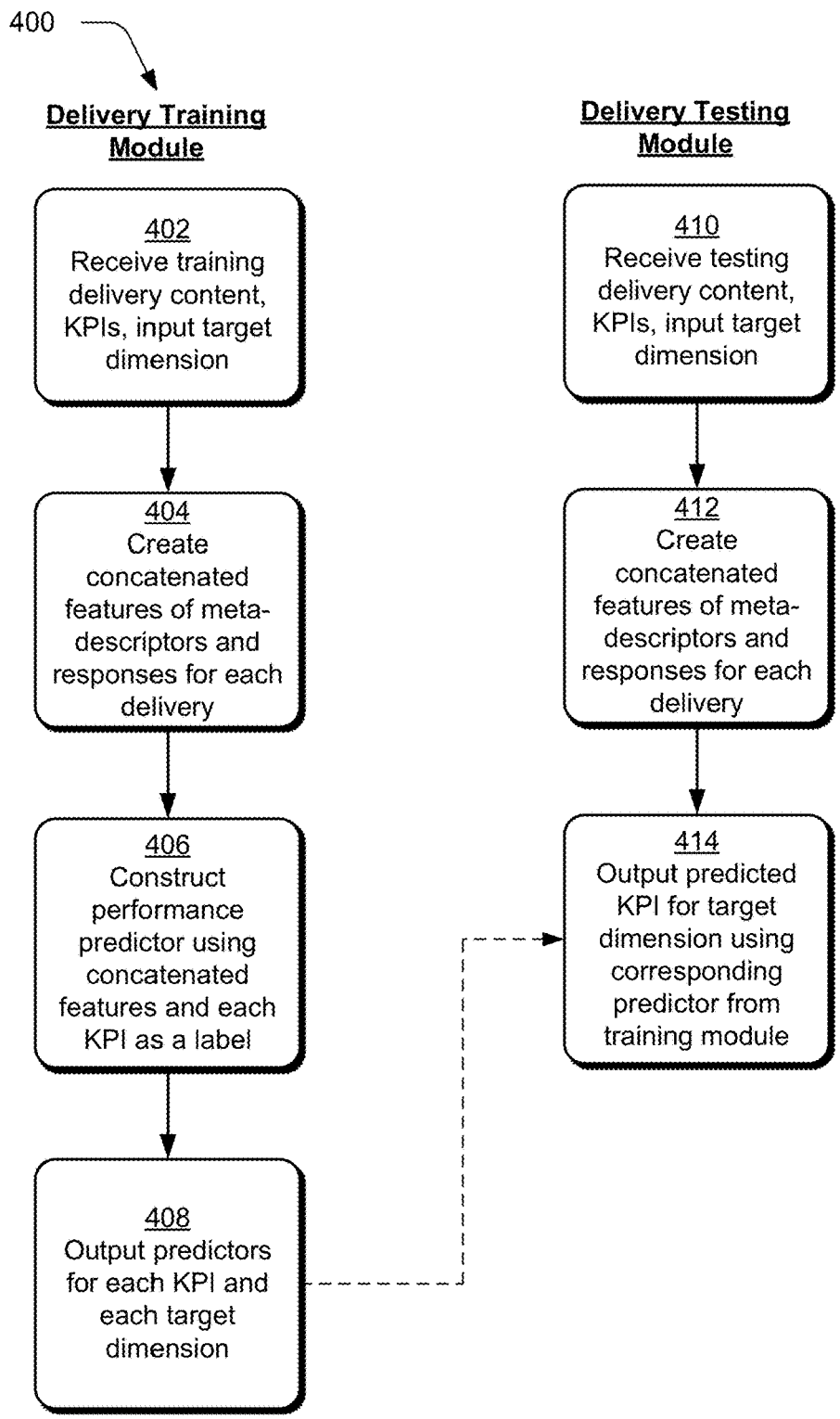
FIG. 4 is a flow diagram that describes operations in a method in accordance with one or more embodiments.

FIG. 4 describes an example procedure 400 for predicting performance at the overall delivery level in accordance with one or more embodiments. Aspects of the procedure may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures may be performed in a digital medium environment by a suitably configured device, such as the example computing device 102 of FIG. 1 that makes use of a delivery building module 109, such as that described above.

Training via the delivery training module 304a, which may be conducted off-line, outputs a predictor to forecast overall delivery campaign performance. At test time, the marketer provides inputs, and the training module receives training delivery content, such as HTML content and the KPI and target dimension he or she is interested in (block 402). The KPIs can include any suitable KPIs such as open rate, click rate, and the like. A target dimension can include any suitable type of target dimension and constitutes the desired target of a particular delivery such as age group, gender, a segment of people, and the like. This can be provided by way of a suitably configured user interface or dashboard. Specifically, in one or more embodiments, the overall delivery training module takes as input, HTML files of the training outbound deliveries and a list of KPIs for which meta-descriptors are to be measured. These inputs are entered into the training module and concatenated features, i.e. meta-descriptors and a response for each delivery HTML, i.e. how the content performed, are created (block 404). Content performance can be quantified using any suitable quantification scheme, e.g., on a scale between 1-100, with 1 being the worst and 100 being the best. Each concatenation consists of one row of data which includes the meta-descriptors and the performance of the particular delivery. There can be many rows of data, e.g. thousands of rows of data. The model then learns from this historic data, in order to predict the performance of any new offer or email based on information about its contents.

Next, a performance predictor is constructed using the concatenated features and each of the KPIs as a label (block 406). A KPI or a key performance indicator is what the marketer is looking to optimize, such as having maximum clicks, maximum number of transactions, or maximum revenue generated from the delivery or offer. So the prediction model wants to predict these KPIs from the meta-descriptors that have been extracted from the data. A pattern-learning algorithm can be employed to process the concatenations, i.e., rows of data, to identify which features of the delivery seem to provide the best performance. The learned model of these good features provides a performance predictor. Performance predictors can be thought of as a set of rules that establish a relationship between the features of the delivery and the actual value of the KPI. This can be performed by using supervised machine learning.

Finally, predictors for each KPI and each target dimension are output (block 408). If a target dimension, such as an age rule of targeting 18-25 year olds, is used in the training data, then the prediction that is produced will describe what would work best for that target dimension. Collectively then, predictions for different target dimensions can be produced and can be used to ascertain which offers or deliveries will perform best, i.e., for which target dimension, and recommend to the marketer to send the offer or delivery to those people.

Testing via the delivery testing module 304b can then be used to test a marketer's actual delivery content, such as HTML and the KPI and target dimension that the marketer is interested in. In this example, input is received in the form of content, such as HTML files of the test outbound delivery and KPI and target dimension to be tested (block 410). From these inputs, concatenated features of meta-descriptors and responses for the test outbound delivery HTML, i.e. the content performance, are created (block 412). As above, content performance can be quantified in any suitable way. Next, a predicted KPI for the target dimension is output using the corresponding predictor from the training module (block 414). That is, testing module uses the predictor from the training module to output a predicted KPI value. Specifically, the set of rules (i.e. the predictor), developed by the training module, when applied to the concatenation of meta-descriptors and content performance for each delivery, produces a predicted KPI value for the individual delivery.

The predicted KPI for the target dimension provides the marketer with a performance prediction relative to the overall delivery. In some embodiments, this can be shown as a dashboard to marketers so that the marketers may see how the email will perform. Consider now the training and testing modules at the offer level.

Offer Level

The marketer is typically also interested in component-level performance of deliveries, such as clickable offers, as well as non-clickable components such as background images and the like. Workflows can be utilized to measure the performance of both types of components using separate workflows for the clickable and non-clickable components because both components can affect performance differently. Clickable components have a user input, whereas non-clickable components do not have a user input. Because of this, for non-clickable components, a KPI estimation is performed to ascertain which kinds of KPIs are to be assigned to the non-clickable components. Having separate workflows for these two different types of components facilitates this process. In the illustrated and described embodiment, each workflow has a training module and a testing module. This level measures how a particular offer will perform.

Figure 5:
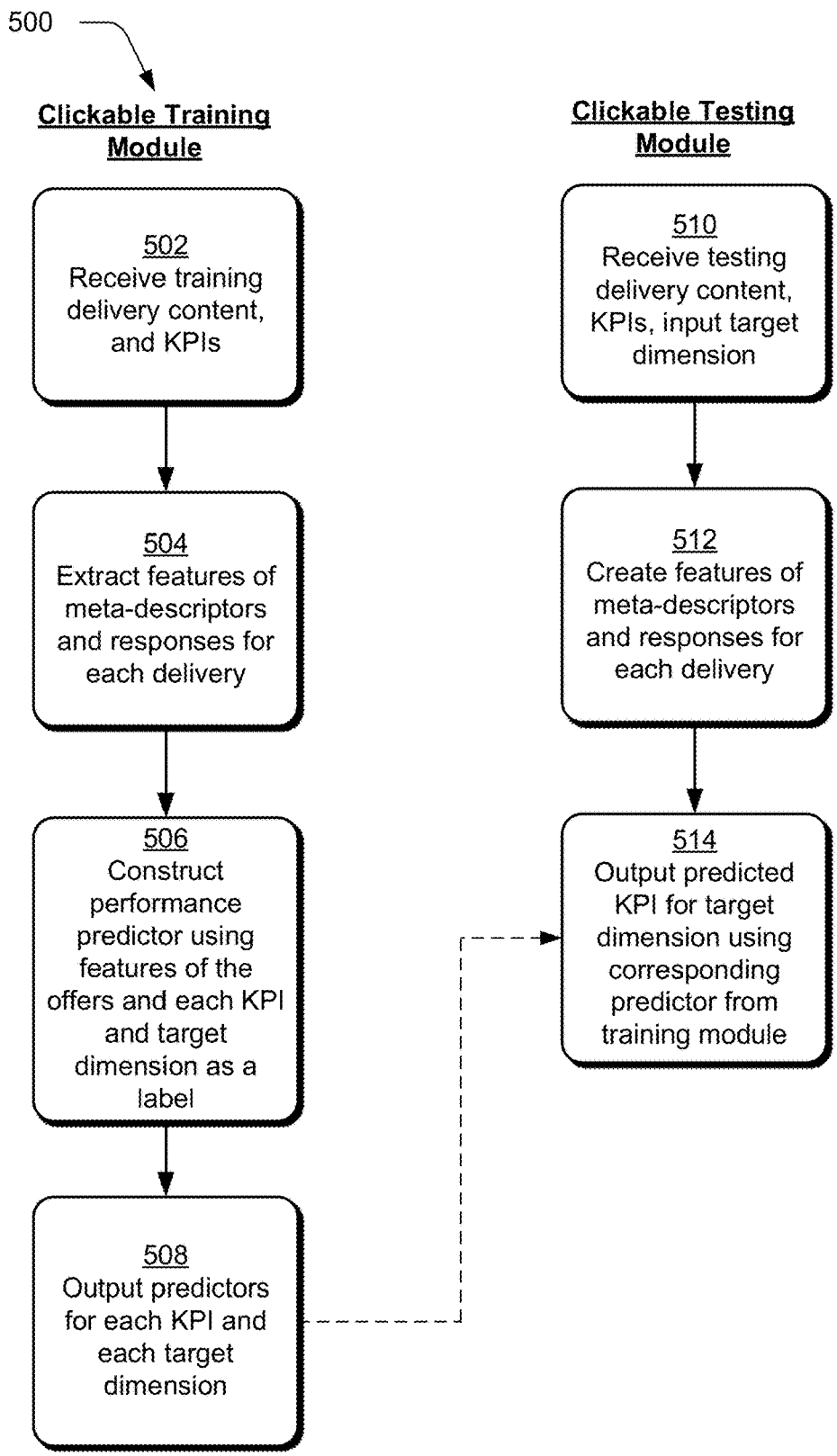
FIG. 5 is a flow diagram that describes operations in a method in accordance with one or more embodiments.

FIG. 5 describes an example procedure 500 for predicting performance at the clickable component level of the offer level in accordance with one or more embodiments. Aspects of the procedure may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures may be performed in a digital medium environment by a suitably configured device, such as the example computing device 102 of FIG. 1 that makes use of a delivery building module 109, such as that described above.

Training via the clickable training module 304c for the clickable components outputs a predictor for each KPI and target dimension. Processing at this level is essentially the same as with the overall delivery level, except at a finer level of granularity. Now, instead of a training module to predict the KPI of the entire delivery, i.e. an email, the process focuses on individual constituents such as clickable offers. In the illustrated example, the training module receives, as input, content such as HTML files of a training set comprising deliveries used for training the model, and a list of KPIs such as open rate, and the like, for each offer within the delivery, and target dimensions (block 502). Next, features of meta-descriptors and responses for each offer from the delivery HTML, i.e. content performance, are extracted (block 504). Content performance can be quantified using any suitable quantification scheme, e.g., on a scale between 1-100, with 1 being the worst and 100 being the best. Each concatenation consists of one row of data which includes the meta-descriptors and the performance of the particular delivery. There can be many rows of data, e.g. thousands of rows of data. Next, a performance predictor is constructed using features of the offers and each of the marketer's KPIs and target dimensions as a label (block 506). A pattern-learning algorithm can be employed to process the concatenations, i.e., rows of data, to identify which features of the offers seem to provide the best performance. The learned model of these good features provides a performance predictor. Performance predictors can be thought of as a set of rules that establish a relationship between the features of the offer and the actual value of the KPI. This can be performed by using supervised machine learning. Finally, predictors for each KPI and target dimension are output (block 508).

Testing via the clickable testing module 304d can then be used to test the marketer's clickable offer. To do so, content such as HTML files of a test set comprising deliveries to be tested are received as input. In addition, the marketer's KPI and target dimension to be tested are received (block 510). The testing module then creates concatenated features of meta-descriptors and responses, content performance, for the offer (block 512). The predicted KPI for the target dimension using the corresponding predictor from the training module is then output (block 514). That is, the testing module uses the predictor from the training module to output a predicted KPI value. Specifically, the set of rules (i.e. the predictor), developed by the training module, when applied to the concatenation of meta-descriptors and content performance for each offer, produces a predicted KPI value for the individual delivery.

The predicted KPI value provides the marketer with a prediction of how clickable components of an offer may perform. That is, an individual KPI may have a range of values that indicate the degree of performance of the clickable component. Clickable components with lower values may indicate poorer performance, while clickable components with higher values may indicate higher levels of performance. Hence, by virtue of the KPIs value, a marketer can ascertain performance as between clickable components.

Figure 6:
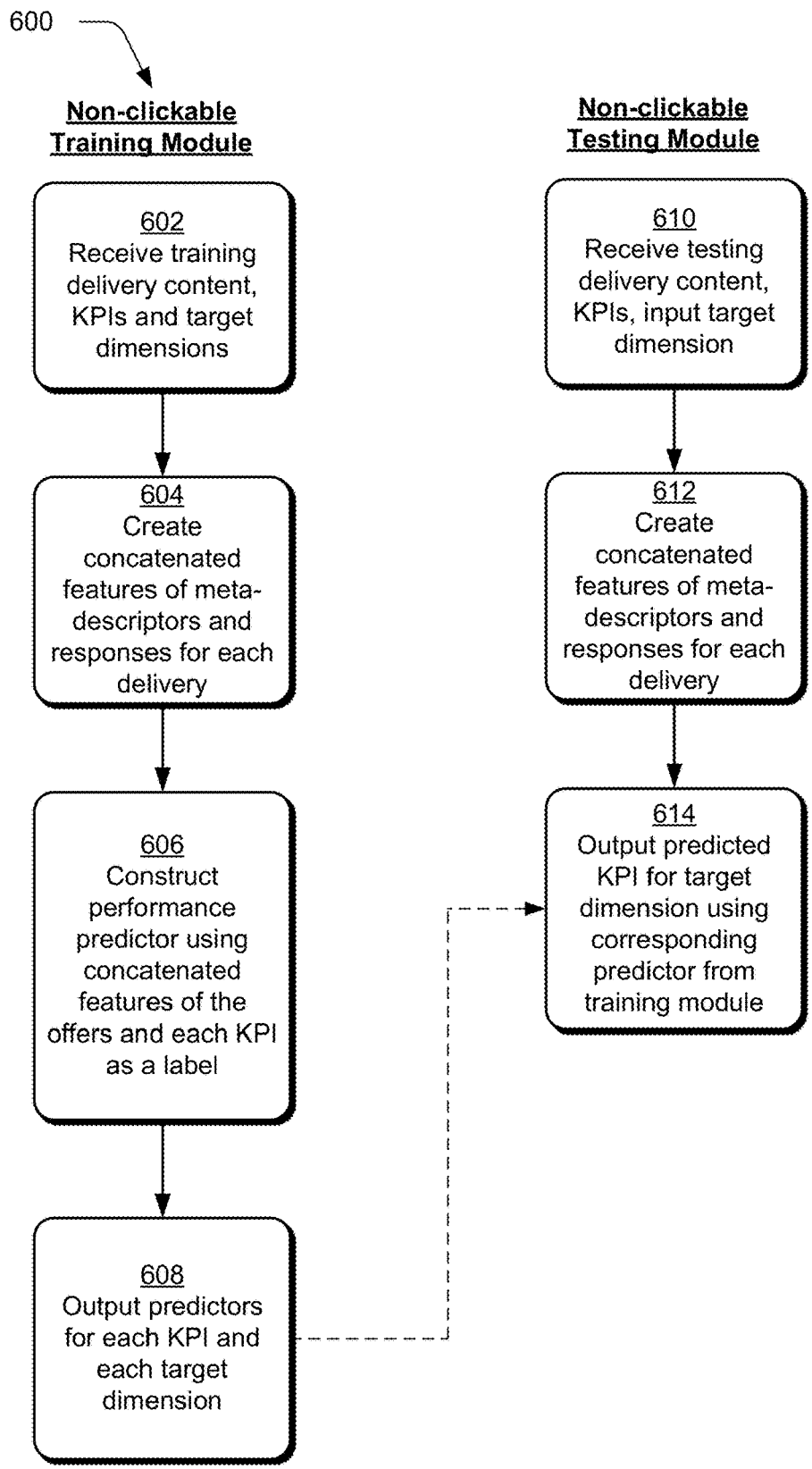
FIG. 6 is a flow diagram that describes operations in a method in accordance with one or more embodiments.

FIG. 6 describes an example procedure 600 for predicting performance at the non-clickable component level of the offer level in accordance with one or more embodiments. Aspects of the procedure may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures may be performed in a digital medium environment by a suitably configured device, such as the example computing device 102 of FIG. 1 that makes use of a delivery building module 109, such as that described above.

Training via the non-clickable training module 304e for the non-clickable component provides predictors for each KPI and target dimension of a non-clickable component. To do so, the non-clickable component training module receives, as input, content such as HTML files of a training set comprising deliveries used for training the model, as well as a list of KPIs such as open rate or click rate for the overall email, as well as each component. Input is also received in the form of the target dimension (block 602). From this, concatenated features of meta-descriptors and responses, i.e. content performance, for each delivery component, e.g., non-clickable components, are created (block 604). Content performance can be quantified using any suitable quantification scheme, e.g., on a scale between 1-100, with 1 being the worst and 100 being the best. Each concatenation consists of one row of data which includes the meta-descriptors and the performance of the particular delivery. There can be many rows of data, e.g. thousands of rows of data. Next, a performance predictor is constructed using the concatenated features and each of the KPIs of each component as a label (block 606). Here, the KPI of the overall delivery is used as the KPI of the non-clickable component. A pattern-learning algorithm can be employed to process the concatenations, i.e., rows of data, to identify which features of the non-clickable components seem to provide the best performance. The learned model of these good features provides a performance predictor. Performance predictors can be thought of as a set of rules that establish a relationship between the features of the non-clickable components and the actual value of the KPI. This can be performed by using supervised machine learning. From this, predictors for each of the KPIs and target dimension are output (block 608).

Testing via the non-clickable testing module 304f for the non-clickable component receives, as input, content such as HTML files of a test set comprising deliveries used for testing the model. In addition, input in the form of the marketer's input of KPI and target dimension is also received (block 610). From this, concatenated features of meta-descriptors and responses, i.e. content performance, for the non-clickable components is created (block 612) and a predicted KPI for the target dimension using the corresponding predictor from the training module is output (block 614). That is, the testing module uses the predictor from the training module to output a predicted KPI value. Specifically, the set of rules (i.e. the predictor), developed by the training module, when applied to the concatenation of meta-descriptors and content performance for each non-clickable component, produces a predicted KPI value. This workflow essentially learns how to predict the KPI's, for non-clickable components, like a background image. It provides a model that can predict the performance for any new non-clickable component, given its meta-descriptors, based on this historic performance information. Consider now training and testing modules at the meta-descriptor level.

Meta-Descriptor Level

The marketer may, in many instances, be interested in testing whether certain meta-descriptors have good performance or not. For example, the marketer may be interested in whether a smiling human face increases the KPI or whether colorful images attract more customers. In the illustrated and described embodiment, two workflows can be utilized in a manner similar to that described above, i.e., a meta-descriptor training module and a meta-descriptor testing module.

Figure 7:
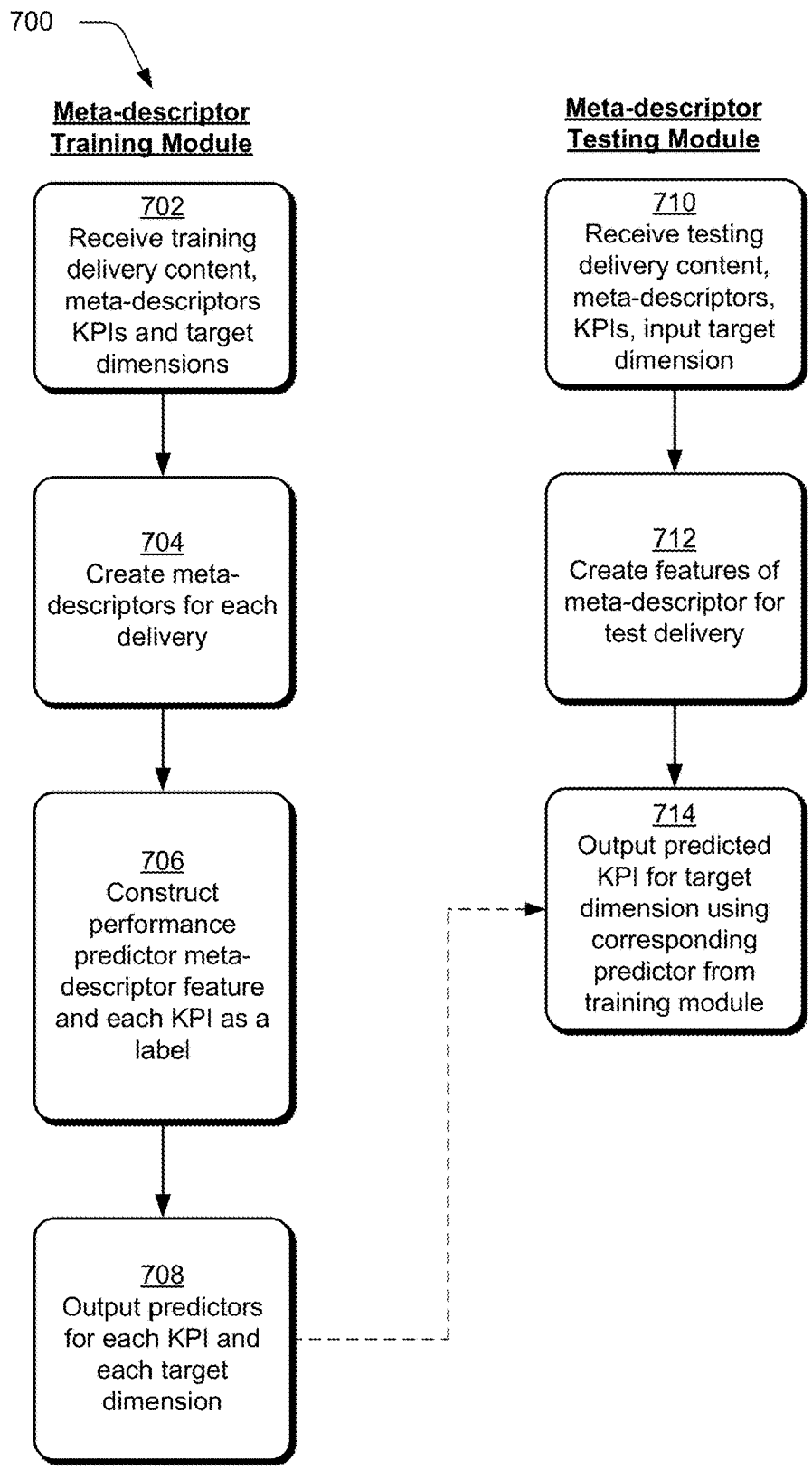
FIG. 7 is a flow diagram that describes operations in a method in accordance with one or more embodiments.

FIG. 7 describes an example procedure 700 for predicting performance at the meta-descriptor level of the offer level in accordance with one or more embodiments. Aspects of the procedure may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures may be performed in a digital medium environment by a suitably configured device, such as the example computing device 102 of FIG. 1 that makes use of a delivery building module 109, such as that described above.

The meta-descriptor training module 304g receives, as input, content such as HTML files of a training set of deliveries and meta-descriptors to be tested. In addition, the input also includes a list of KPIs such as open rate, click rate, and the like for the overall delivery, as well as each component. In addition, a target dimension is also received as input (block 702). From this, meta-descriptors from each overall delivery HTML, as well as its components, are created (block 704). Meta-descriptors are extracted for the overall delivery, as well as its different components, such as clickable and non-clickable components. A performance predictor is constructed using the meta-descriptor feature and each of the KPIs as a label (block 706), using a supervised learning machine as described above. Predictors for each KPI and target dimension are then output (block 708).

The meta-descriptor testing module 304h receives, as input, content such as HTML files of a test set of deliveries and meta-descriptors to be tested. In addition, input in the form of a marketer's KPI and target dimension to be tested is also received (block 710). From this, a meta-descriptor feature for the test delivery HTML is created (block 712), as described above. A predicted KPI is output for the target dimension using the corresponding predictor from the training module (block 714), as described above. That is, the testing module uses the predictor from the training module to output a predicted KPI value. Specifically, the set of rules (i.e. the predictor), developed by the training module, when applied to the meta-descriptor feature produces a predicted KPI value for the target dimension.

Having considered various aspects of outbound delivery performance prediction, consider now an example outbound delivery offer assignment workflow that can utilize the information developed just above.

Outbound Delivery Offer Assignment Module

The above-described workflows can be utilized to assist the marketer in composing an engaging campaign. That is, for example, when the predictors described above learn which meta-descriptors of an email seem to lead to a better KPI, weights can be assigned to the meta-descriptors accordingly and used as tags. Marketers can then search for particular tags to find deliveries that are then presented in decreasing order of weights. As an example, consider the following.

Figure 8:
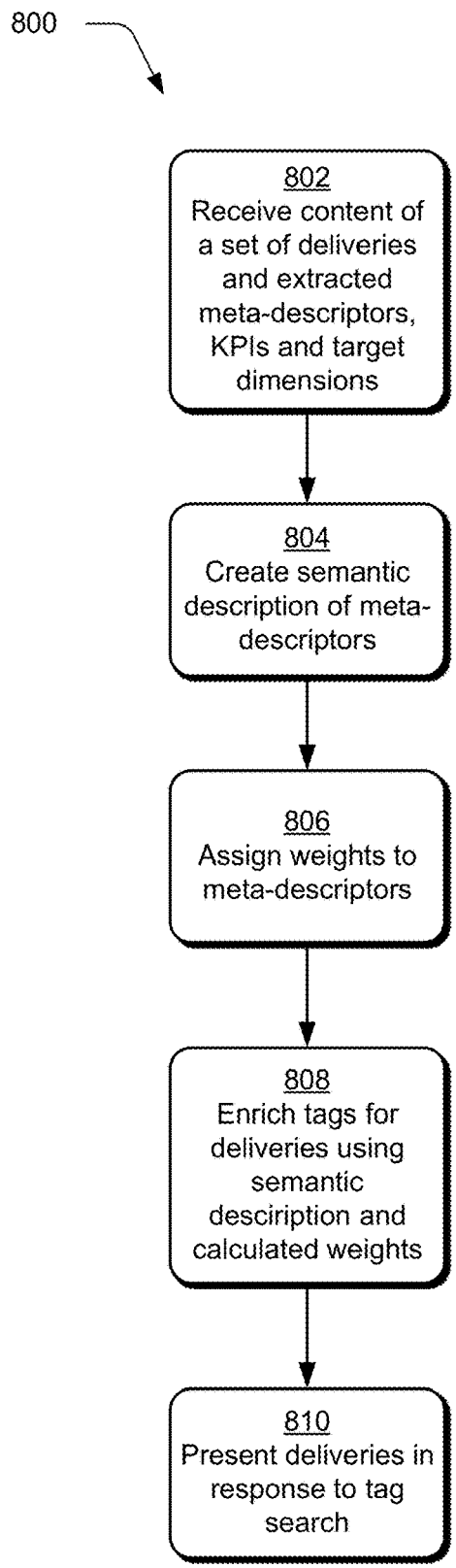
FIG. 8 is a flow diagram that describes operations in a method in accordance with one or more embodiments.

FIG. 8 describes an example procedure 800 for presenting deliveries to a marketer when the marketer searches for a particular tag in accordance with one or more embodiments. Aspects of the procedure may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures may be performed in a digital medium environment by a suitably configured device, such as the example computing device 102 of FIG. 1 that makes use of a delivery building module 109, such as that described above.

In accordance with one or more embodiments, outbound delivery offer assignment module 306 (FIG. 3) receives, as input, content such as HTML files of a set of deliveries and extracted meta-descriptors. The input also includes marketer input in the form of KPI and target dimensions (block 802). Next, a semantic description of the meta-descriptors is created (block 804). So, for example, a semantic description can include "human smiling" for a meta-descriptor that identifies a human face. Weights are then assigned according to the performance prediction workflow (block 806) described above. That is, when the predictors learn which meta-descriptors of a particular delivery lead to better KPI values, weights can be assigned accordingly. Thus, better performing meta-descriptors will receive higher weights. Weights can be assigned in any suitable way. In at least some embodiments weights can be assigned as described in Blum, A., Langley, P., "Selection of relevant features and samples and machine learning." Artificial Intelligence 97 (1997), 245-271. Next, tags for deliveries are enriched using the semantic description and the calculated weights (block 808). The tags are enriched by associating the weights and the semantic descriptions with the individual respective deliveries. This creates a searchable collection of deliveries that can be searched by the enriched tags. For example, a delivery can be tagged as containing smiling faces, and a corresponding weight can be attached as described earlier.

When a tag is searched by a marketer, deliveries are presented to the marketer in decreasing order of weights (block 810). For example, a marketer can search for different tags like "smiling face" or "red text images". The deliveries containing these tags would be presented to marketer in decreasing order of performance, or in decreasing order of their contribution to the prediction model. This provides deliveries which can provide the maximum predicted KPI.

Figure 9:
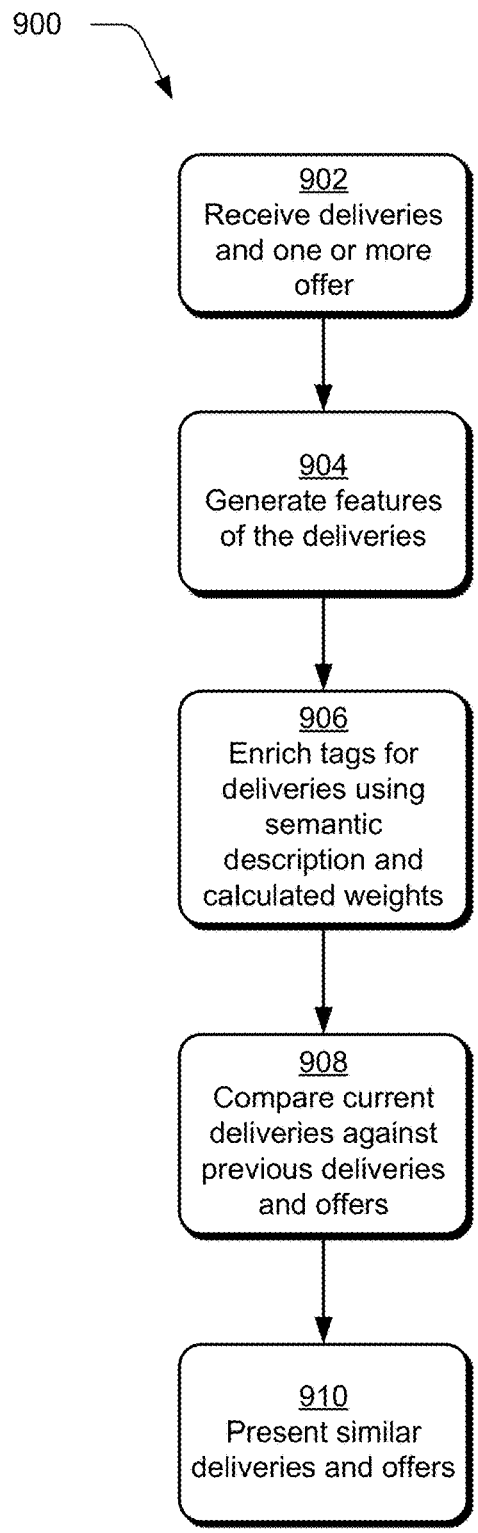
FIG. 9 is a flow diagram that describes operations in a method in accordance with one or more embodiments.

FIG. 9 describes an example procedure 900 for assigning offers to deliveries in accordance with one or more embodiments. Aspects of the procedure may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures may be performed in a digital medium environment by a suitably configured device, such as the example computing device 102 of FIG. 1 that makes use of a delivery building module 109, such as that described above.

In accordance with one or more embodiments, outbound delivery offer assignment module 306 (FIG. 3) receives as input, deliveries and offers the marketer wishes to propose (block 902). The outbound delivery offer assignment module then generates features (e.g., meta-descriptors) of the deliveries (block 904). Tags for the deliveries are enriched using semantic descriptions and calculated weights, as described above (block 906). Next, the current deliveries are compared against previous deliveries and offers using a similarity computation against tags and/or features (block 908). There are many methods to identify which deliveries or offers are similar to each other. In at least some embodiments, this is done by comparing the meta-descriptors of one delivery to another. For example, a previous delivery that matched three out of five meta-descriptors of the current delivery and had the same semantic description as the current delivery will have a higher score than a previous delivery that matched one out of five meta-descriptors of the current delivery and had a semantic description that did not match the current delivery. This enables marketers to browse through previous deliveries with similar tags and meta-descriptors. Marketers can then look for the most similar, yet better performing offers/meta-descriptors like layout and then incorporate them in the current delivery. Similar deliveries and offers can be presented to the marketer along with their historic performance (block 910). This assists the marketers in assigning similar related, high-performing offers into deliveries.

Essentially, the process described just above enables a workflow to present similar high-performing historic offers to marketers so that the marketer can compose the delivery accordingly. This uses the new tags that were provided just above, compared against the tags of the required delivery. A similarity score is computed to identify and list related offers, sorted according to their similarity and historic performance. The marketer can then choose the appropriate offer, based on its similarity and historic performance.

Figure 10:
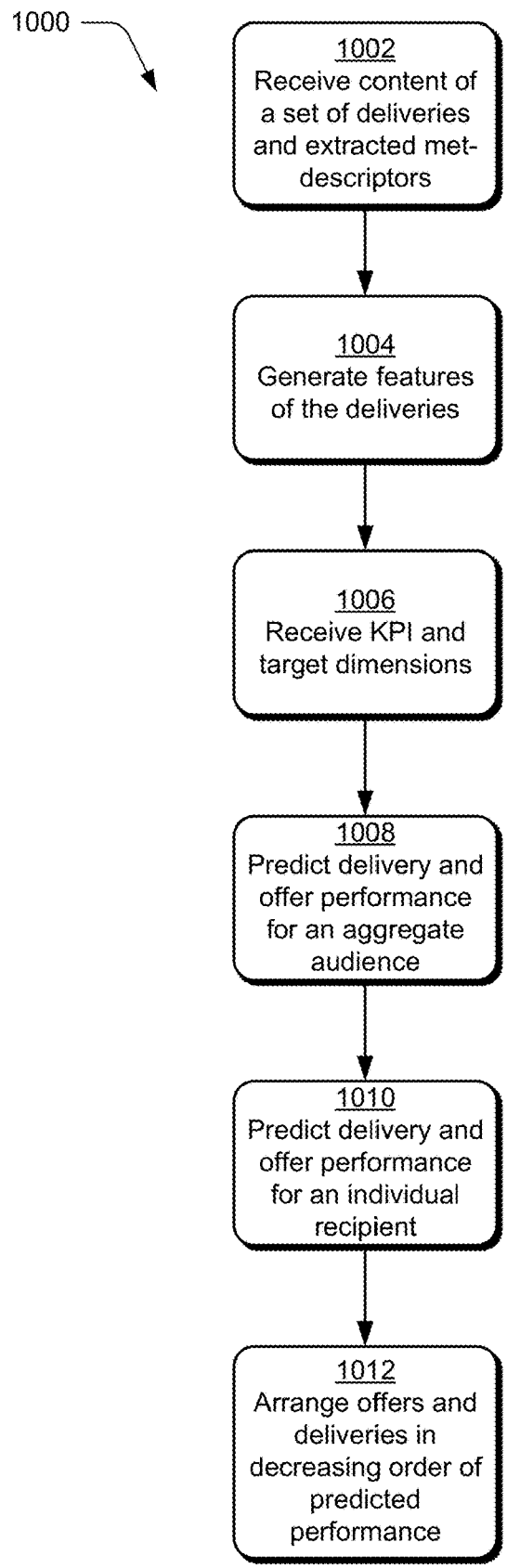
FIG. 10 is a flow diagram that describes operations in a method in accordance with one or more embodiments.

FIG. 10 describes an example procedure 1000 for assigning offers to deliveries in accordance with one or more embodiments, in which assignments are made specific to recipients. Aspects of the procedure may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures may be performed in a digital medium environment by a suitably configured device, such as the example computing device 102 of FIG. 1 that makes use of a delivery building module 109, such as that described above.

Content of a set of deliveries, such as HTML files and extracted meta-descriptors are received as input to the outbound delivery offer assignment module (block 1002). In addition, features (e.g., meta-descriptors) of the deliveries are generated (block 1004) and KPI and target dimensions are received from the marketer (block 1006). Delivery and offer performance for aggregate consumers is predicted using a trained model to predict the click rate (block 1008), as described above. Delivery and offer performance for an individual recipient is predicted using a trained model based on the user's history alone (block 1010). Offers and deliveries are then arranged in decreasing order of predicted performance and presented via a suitable user interface (block 1012). Deliveries and offers can then be assigned to individual recipients.

Experimental Setup

Consider the following experimental set up which employs the following workflow. The delivery building module receives input HTML files of deliveries and from these files creates a histogram of meta-descriptors and responses, i.e. performance. The histogram is the input set of features or independent variables which is used by the model to identify patterns and relationships between independent variables and the KPI. For example, emails with red font color always get a high click rate, is one kind of inference that this automatic model can make. Meta-descriptor vectors of the deliveries are constructed. A meta-descriptor vector is a list of meta-descriptors for the entire delivery. Next, the KPIs are identified and the model is trained against observed behavior or other ground truths. This can be done using supervised machine learning as described above. The model is then applied to unseen data to derive the expected behavior and a sorted list of meta-descriptors is created based on their contribution toward the marketer's KPI. As an example, consider the following dataset description.

Dataset Description

A dataset of 7.9 million deliveries was developed, sent to 3.8 million recipients over a period of 1 week, through 7 email campaigns, which are represented in the table illustrated in FIG. 11. The table in FIG. 11 presents some of the raw frequencies for some of the meta-descriptors, at the level of the delivery. The campaign code is shown in the far left column. In this example, the KPI that is sought to be predicted is the "click-to-open rate." The relevant meta-descriptors are shown starting with column designated "Number of images". Each meta-descriptor column contains the raw frequencies for each campaign. So, for campaign "DM114668" the number of images was 14, and so on.

Figure 13:
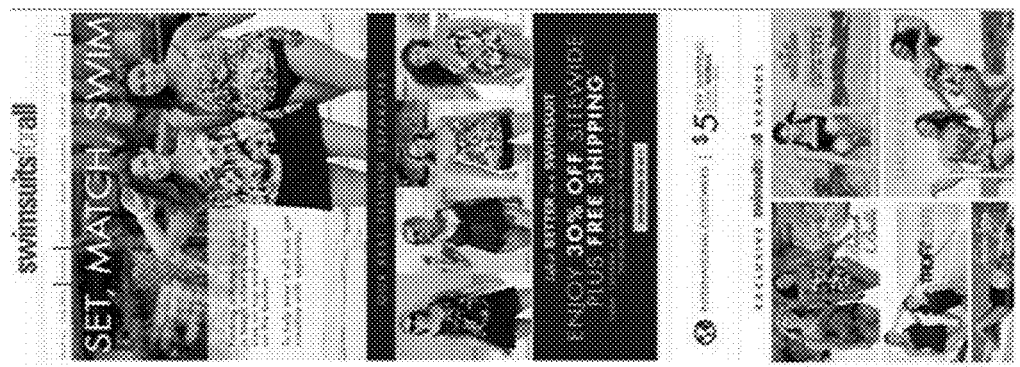
FIG. 13 illustrates two offers in accordance with one embodiment.
Figure 13:
Figure 14:
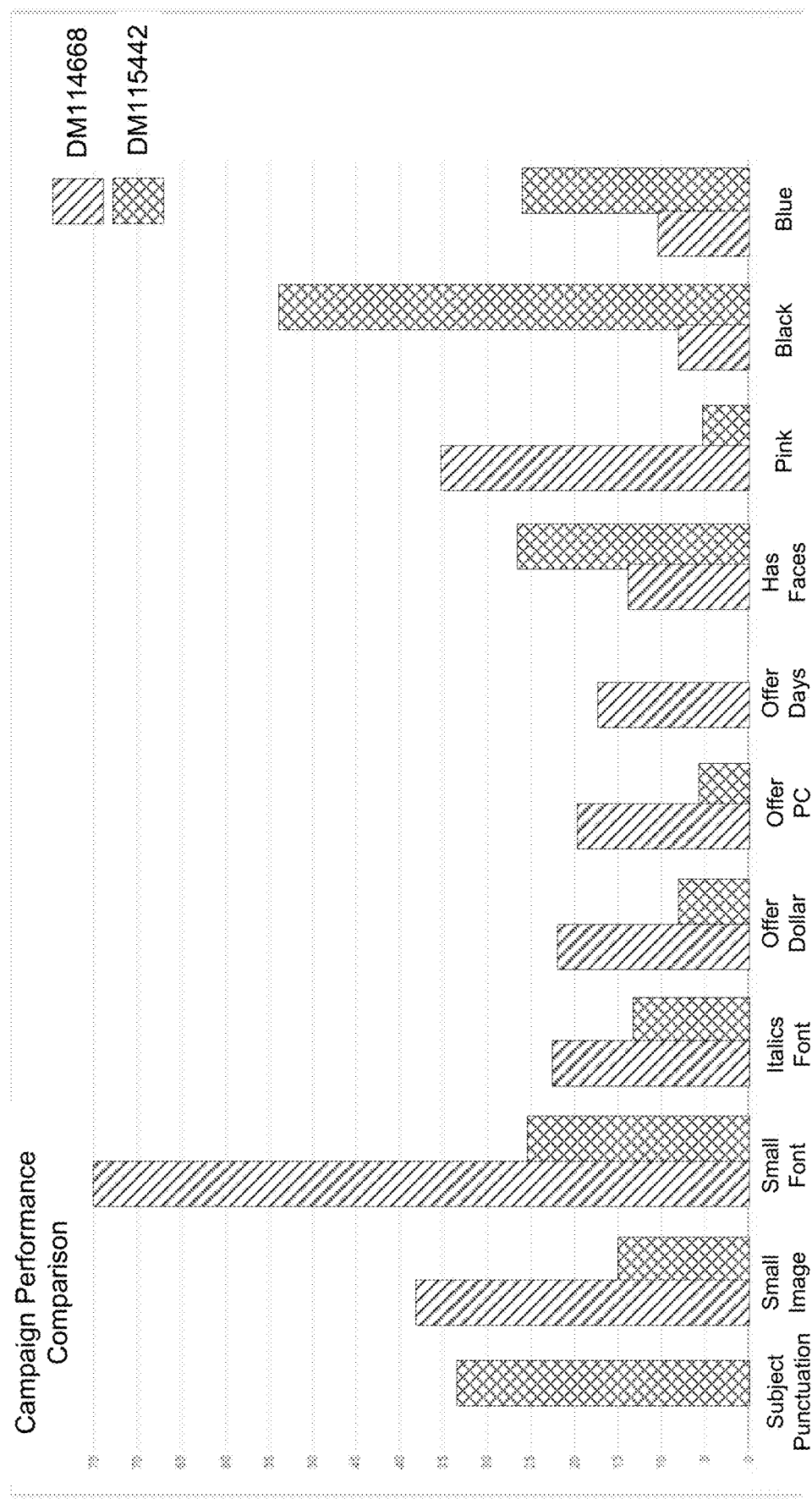
FIG. 14 is a histogram in accordance with one or more embodiments.

FIG. 12 illustrates the raw frequencies for each of the content pieces in delivery "DM114668", where individual offers have an average click rate of 0.108 and a standard deviation of 0.113. Finally, a qualitative, pairwise comparison of two email deliveries is conducted to ascertain whether the difference in meta-descriptors is worth exploring. For example, FIG. 13 illustrates the email content of deliveries "DM114668" and "DM115442." Delivery "DM114668" has an average click-to-open rate of 9.2 clicks per 100 opens, and "DM115442" has an average click-to-open rate of 13.6 clicks per 100 opens. After normalizing the raw frequencies for the proportionate presence of meta-descriptors, the histogram illustrated in FIG. 14 was obtained. This shows the contrast in the meta-descriptors of the two deliveries. Accordingly, the marketer would know, from the prediction model, the weights of each of the meta-descriptors, or how much the meta-descriptors contribute to the KPI. If the marketer is choosing between two meta-descriptors, he or she would naturally want to choose offers/deliveries with those meta-descriptors which are positively and strongly correlated with the KPI, according to the model. This illustrates which meta-descriptors were found to be more important than other meta-descriptors. So for similar campaigns promoting similar products, the difference in the importance of the meta-descriptors can be ascertained.

The tables of FIGS. 11 and 12 highlight the noticeable difference in meta-descriptors, hinting that it could be worth exploring the relationship between meta-descriptors and delivery performance.

Having considered the above implementations, consider now an example system and device that can be utilized to practice the inventive principles described herein.

Example System and Device

Figure 15:
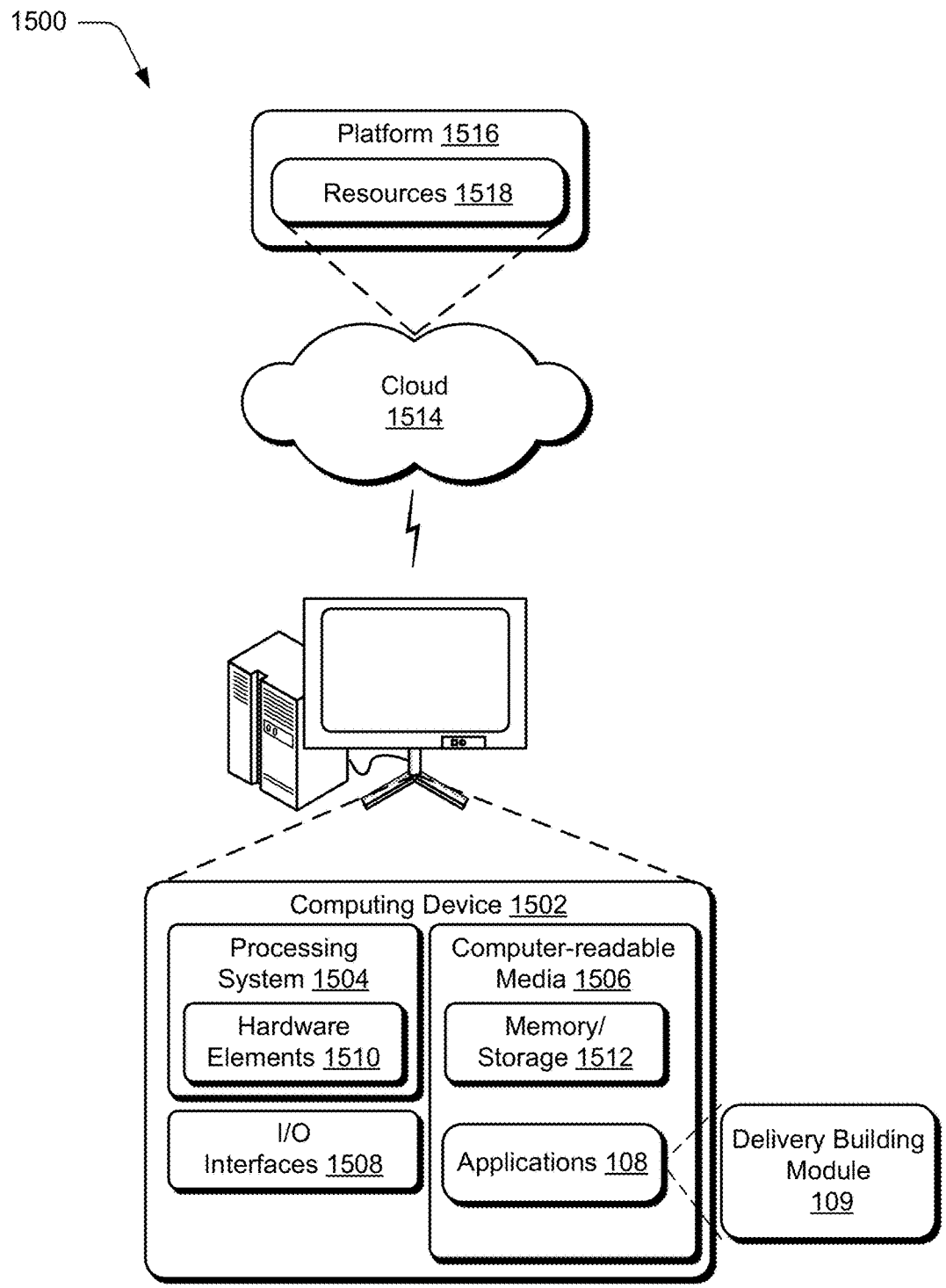
FIG. 15 illustrates an example system including various components of an example device that can be employed for one or more search implementations described herein.

FIG. 15 illustrates an example system generally at 1500 that includes an example computing device 1502 that is representative of one or more computing systems and/or devices that may implement the various techniques described herein. This is illustrated through inclusion of the applications 208 and, in particular, delivery building module 209, which operates as described above. The computing device 1502 may be, for example, a server of a service provider, a device associated with a client (e.g., a client device), an on-chip system, and/or any other suitable computing device or computing system.

The example computing device 1502 is illustrated as including a processing system 1504, one or more computer-readable media 1506, and one or more I/O interface 1508 that are communicatively coupled, one to another. Although not shown, the computing device 1502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1504 is representative of functionality to perform one or more operations using hardware. Accordingly, the processing system 1504 is illustrated as including hardware elements 1510 that may be configured as processors, functional blocks, and so forth. This may include implementation in hardware as an application specific integrated circuit or other logic device formed using one or more semiconductors. The hardware elements 1510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1506 is illustrated as including memory/storage 1512. The memory/storage 1512 represents memory/storage capacity associated with one or more computer-readable media. The memory/storage component 1512 may include volatile media (such as random access memory (RAM)) and/or nonvolatile media (such as read only memory (ROM), Flash memory, optical disks, magnetic disks, and so forth). The memory/storage component 1512 may include fixed media (e.g., RAM, ROM, a fixed hard drive, and so on) as well as removable media (e.g., Flash memory, a removable hard drive, an optical disc, and so forth). The computer-readable media 1506 may be configured in a variety of other ways as further described below.

Input/output interface(s) 1508 are representative of functionality to allow a user to enter commands and information to computing device 1502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1502. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1510 and computer-readable media 806 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1510. The computing device 1502 may be configured to implement particular instructions and/or functions corresponding to the software and/or hardware modules. Accordingly, implementation of a module that is executable by the computing device 1502 as software may be achieved at least partially in hardware, e.g., through use of computer-readable storage media and/or hardware elements 1510 of the processing system 1504. The instructions and/or functions may be executable/operable by one or more articles of manufacture (for example, one or more computing devices 1502 and/or processing systems 1504) to implement techniques, modules, and examples described herein.

The techniques described herein may be supported by various configurations of the computing device 1502 and are not limited to the specific examples of the techniques described herein. This functionality may also be implemented all or in part through use of a distributed system, such as over a "cloud" 1514 via a platform 1516 as described below.

The cloud 1514 includes and/or is representative of a platform 1516 for resources 818. The platform 1516 abstracts underlying functionality of hardware (e.g., servers) and software resources of the cloud 1514. The resources 1518 may include applications and/or data that can be utilized while computer processing is executed on servers that are remote from the computing device 1502. Resources 1518 can also include services provided over the Internet and/or through a subscriber network, such as a cellular or Wi-Fi network.

The platform 1516 may abstract resources and functions to connect the computing device 1502 with other computing devices. The platform 1516 may also serve to abstract scaling of resources to provide a corresponding level of scale to encountered demand for the resources 1518 that are implemented via the platform 1516. Accordingly, in an interconnected device implementation, implementation of functionality described herein may be distributed throughout the system 1500. For example, the functionality may be implemented in part on the computing device 1502 as well as via the platform 1516 that abstracts the functionality of the cloud 1514.

CONCLUSION

Various embodiments are directed to assigning offers to marketing deliveries utilizing new features to describe offers in the marketing deliveries. Marketing deliveries can be described at a finer level to thus enhance the effectiveness of building and conducting marketing campaigns. The approaches facilitate matching content to recipients, predicting content performance, and measuring content performance after dispatching a marketing delivery.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment for building a campaign of electronic deliveries, a method implemented by a computing device, the method comprising:
   receiving, by the computing device:
      content for inclusion as part of multiple electronic deliveries of the campaign, each of the multiple electronic deliveries providing a different visual representation of the content;
      at least one key performance indicator for measuring a success of the campaign; and
      an input target dimension that specifies a target group of multiple users for the campaign;
   extracting, by the computing device, a plurality of meta-descriptors from the content, the plurality of meta-descriptors including a layout meta-descriptor that describes a placement configuration of text relative to an image in the content, the layout meta-descriptor being extracted by generating a spatial histogram of the content; and
   outputting, by the computing device, a predicted value for the at least one key performance indicator for each of the multiple electronic deliveries, the predicted value for the at least one key performance indicator being generated using a model trained to identify a relationship among the input target dimension, the at least one key performance indicator, and at least one of the plurality of meta-descriptors.

2. The method of claim 1, wherein the plurality of meta-descriptors include a color meta-descriptor that describes hue and saturation of images within the content.

3. The method of claim 1, wherein the plurality of meta-descriptors include a font and style meta-descriptor that describes at least one of: a proportion of text relative to at least one image in the content; a style, color, and size of the text; or at a quantity and size of the at least one image.

4. The method of claim 1, wherein the plurality of meta-descriptors include a human meta-descriptor that specifies at least one of a number of people depicted in the content or attributes of the people depicted in the content.

5. The method of claim 1, wherein the plurality of meta-descriptors include a theme meta-descriptor that specifies a proportion of sales and discounts included in the content.

6. The method of claim 1, wherein the key performance indicator specifies one of an open rate or a click rate for the content.

7. In a digital medium environment for building a campaign of electronic deliveries, a system comprising:
   one or more processors; and
   a computer-readable storage medium storing instructions that are executable by the one or more processors to perform operations comprising:
      receiving content to be included as part of multiple electronic deliveries of the campaign, each of the multiple electronic deliveries providing a different visual representation of the content;
      receiving an input target dimension that specifies a target group of multiple users for the campaign and a key performance indicator for measuring a success of the campaign relative to the input target dimension;
      extracting at least one meta-descriptor from the content, the at least one meta-descriptor including a layout meta-descriptor that describes a placement configuration of text relative to an image in the content, the layout meta-descriptor being extracted by generating a spatial histogram of the content;
      determining a predicted value for the key performance indicator for each of the multiple electronic deliveries, the predicted value for the key performance indicator being generated using a model trained to identify a relationship among the input target dimension, the key performance indicator, and the at least one meta-descriptor; and
      composing the campaign by selecting a subset of the multiple electronic deliveries based on the predicted values.

8. The system of claim 7, wherein receiving the content comprises receiving at least one Hyper Text Markup Language (HTML) file that includes the content.

9. The system of claim 7, wherein the at least one meta-descriptor comprises a human meta-descriptor that specifies at least one of a number of people depicted in the content or attributes of the people depicted in the content.

10. The system of claim 7, wherein the at least one meta-descriptor comprises a font and style meta-descriptor that describes at least one of:
   a proportion of text relative to at least one image in the content;
   a style, color, and size of the text; or
   a quantity and size of the at least one image.

11. The system of claim 7, wherein the at least one meta-descriptor comprises a color meta-descriptor that describes hue and saturation of images within the content.

12. The system of claim 7, wherein the key performance indicator specifies one of an open rate or a click rate for the content.

13. In a digital medium environment for evaluating an electronic delivery that includes at least one offer, a method implemented by a computing device, the method comprising:
   receiving, by the computing device, content of a set of deliveries and extracted meta-descriptors for the received content;
   receiving key performance indicators and target dimensions for the set of deliveries;
   creating a semantic description of the meta-descriptors and assigning weights to the meta-descriptors using a performance prediction workflow, the weights being calculated as a function of values for the key performance indicators produced by the performance prediction workflow for each of the target dimensions;
   generating at least one tag for each delivery in the set of deliveries using the semantic description and the weighted meta-descriptors; and
   responsive to receiving an electronic delivery not included in the set of deliveries, identifying a subset of the set of deliveries that are similar to the electronic delivery using their associated tags and presenting the subset of the set of deliveries in an order based on the weighted meta-descriptors.

14. The method of claim 13, wherein presenting the subset of deliveries in the order based on the weighted meta-descriptors comprises displaying at least one historic performance metric for each delivery in the subset of deliveries.

15. The method of claim 13, the extracted meta-descriptors comprising a layout meta-descriptor that describes a placement configuration of text relative to an image in the content, the layout meta-descriptor being extracted by generating a spatial histogram of the content.

16. The method of claim 13, the extracted meta-descriptors comprising a human meta-descriptor that specifies at least one of a number of people depicted in the content or attributes of the people depicted in the content.

17. The method of claim 13, the extracted meta-descriptors comprising a font and style meta-descriptor that describes at least one of:
- a proportion of text relative to at least one image in the content;
- a style, color, and size of the text; or
- a quantity and size of the at least one image.

18. The method of claim 13, the extracted meta-descriptors comprising a color meta-descriptor that describes hue and saturation of images within the content.

19. The method of claim 13, wherein receiving the content comprises receiving at least one Hyper Text Markup Language (HTML) file that includes the content.

20. The method of claim 1, wherein receiving the content comprises receiving at least one Hyper Text Markup Language (HTML) file that includes the content.

\* \* \* \* \*